(12) United States Patent
Kerner et al.

(10) Patent No.: US 10,726,290 B2
(45) Date of Patent: Jul. 28, 2020

(54) SYSTEM FOR ACCURATE 3D MODELING OF GEMSTONES

(71) Applicant: SARINE TECHNOLOGIES LTD., Kfar Saba (IL)

(72) Inventors: Abraham Kerner, Herzelia (IL); Shilo Stoper, Ramat Gan (IL); Akiva Caspi, Nirit (IL)

(73) Assignee: SARINE TECHNOLOGIES LTD. (IL)

( * ) Notice: Subject to any disclaimer, the term of this patent is extended or adjusted under 35 U.S.C. 154(b) by 0 days.

(21) Appl. No.: 16/220,690

(22) Filed: Dec. 14, 2018

(65) Prior Publication Data

US 2019/0325248 A1   Oct. 24, 2019

Related U.S. Application Data

(63) Continuation of application No. 14/653,679, filed as application No. PCT/IL2013/051041 on Dec. 19, 2013, now abandoned.

(30) Foreign Application Priority Data

Dec. 20, 2012   (IL) .......................................... 223763

(51) Int. Cl.
*H04N 15/00* (2006.01)
*G06K 9/46* (2006.01)
(Continued)

(52) U.S. Cl.
CPC ............ *G06K 9/4604* (2013.01); *G01B 11/24* (2013.01); *G01N 21/87* (2013.01); *G06K 9/46* (2013.01);
(Continued)

(58) Field of Classification Search
CPC .......... G06K 9/4604; G06K 9/46; G06K 9/52; G06K 2009/4666; G06T 7/564;
(Continued)

(56) References Cited

U.S. PATENT DOCUMENTS 6,014,208 A   1/2000   Welbourn et al.
6,567,156 B1   5/2003   Kerner
(Continued)

FOREIGN PATENT DOCUMENTS

CN   1196120   10/1998
CN   1478200   2/2005
(Continued)

OTHER PUBLICATIONS

Talvala et al., "Veiling Glare in High Dynamic Range Imaging" Stanford University, 9 Pages, vol. 26 (2007).
(Continued)

*Primary Examiner* — Jayanti K Patel
*Assistant Examiner* — Richard B Carter
(74) *Attorney, Agent, or Firm* — Isus Intellectual Property PLL; Anthony Jason Mirabito

(57) ABSTRACT

A computerized system, kit and method for producing an accurate 3D-Model of a gemstone by obtaining an original 3D-model of an external surface of the gemstone; imaging at least one selected junction with only portions of its associated facets and edges disposed adjacent the junction, the location of the junction being determined based on information obtained at least partially by using the original 3D model; analyzing results of the imaging to obtain information regarding details of the gemstone at the junction; and using the information for producing an accurate 3D-model of said external surface of the gemstone, which is more accurate than the original 3-D model.

36 Claims, 17 Drawing Sheets

(51) Int. Cl.
  *H04N 13/204* (2018.01)
  *G01N 21/87* (2006.01)
  *G01B 11/24* (2006.01)
  *G06T 7/73* (2017.01)
  *G06T 7/564* (2017.01)
  *G06K 9/52* (2006.01)
  *G06T 3/40* (2006.01)
  *G06T 5/00* (2006.01)
  *G06T 7/60* (2017.01)
  *G06T 15/00* (2011.01)
  *H04N 5/225* (2006.01)
  *H04N 5/232* (2006.01)

(52) U.S. Cl.
  CPC .............. *G06K 9/52* (2013.01); *G06T 3/4053* (2013.01); *G06T 5/00* (2013.01); *G06T 7/564* (2017.01); *G06T 7/60* (2013.01); *G06T 7/75* (2017.01); *G06T 15/005* (2013.01); *H04N 5/2252* (2013.01); *H04N 5/2256* (2013.01); *H04N 5/23245* (2013.01); *H04N 13/204* (2018.05); *G06K 2009/4666* (2013.01)

(58) Field of Classification Search
  CPC G06T 7/75; G06T 3/4053; G06T 5/00; G06T 7/60; G06T 15/005; H04N 13/204; H04N 5/2252; H04N 5/2256; H04N 5/23245; G01B 11/24; G01N 21/87
  USPC .................. 348/46; 703/1; 382/108; 356/30
  See application file for complete search history.

(56) References Cited

U.S. PATENT DOCUMENTS

| | | | |
|---|---|---|---|
| 7,259,839 B2 | 8/2007 | Sivovolenko | |
| 7,260,544 B1 | 8/2007 | Reinitz et al. | |
| 7,436,498 B2 | 10/2008 | Kerner et al. | |
| 2004/0246464 A1* | 12/2004 | Sivovolenko | G01N 21/87 |
| | | | 356/30 |
| 2005/0117145 A1 | 6/2005 | Altman et al. | |
| 2007/0157667 A1 | 7/2007 | Maltezos | |
| 2007/0285650 A1 | 12/2007 | Kerner et al. | |
| 2008/0186306 A1 | 8/2008 | Darphin | |
| 2010/0086179 A1* | 4/2010 | Verboven | G06T 7/0004 |
| | | | 382/108 |
| 2010/0250201 A1* | 9/2010 | Sivovolenko | G06T 17/10 |
| | | | 703/1 |
| 2011/0000259 A1 | 1/2011 | Strnad, III | |
| 2012/0007971 A1 | 1/2012 | Schnitzer et al. | |
| 2012/0274751 A1 | 11/2012 | Smith et al. | |

FOREIGN PATENT DOCUMENTS

| | | |
|---|---|---|
| CN | 1902474 | 1/2007 |
| CN | 101086443 | 12/2007 |
| CN | 101118570 | 2/2008 |
| WO | 199961890 | 12/1999 |

OTHER PUBLICATIONS

International Search Report from International Application No. PCT/IL2013/051041 dated Jul. 8, 2014.

International Preliminary Report on Patentability from International Application No. PCT/IL2013/051041 dated Mar. 30, 2015.

* cited by examiner

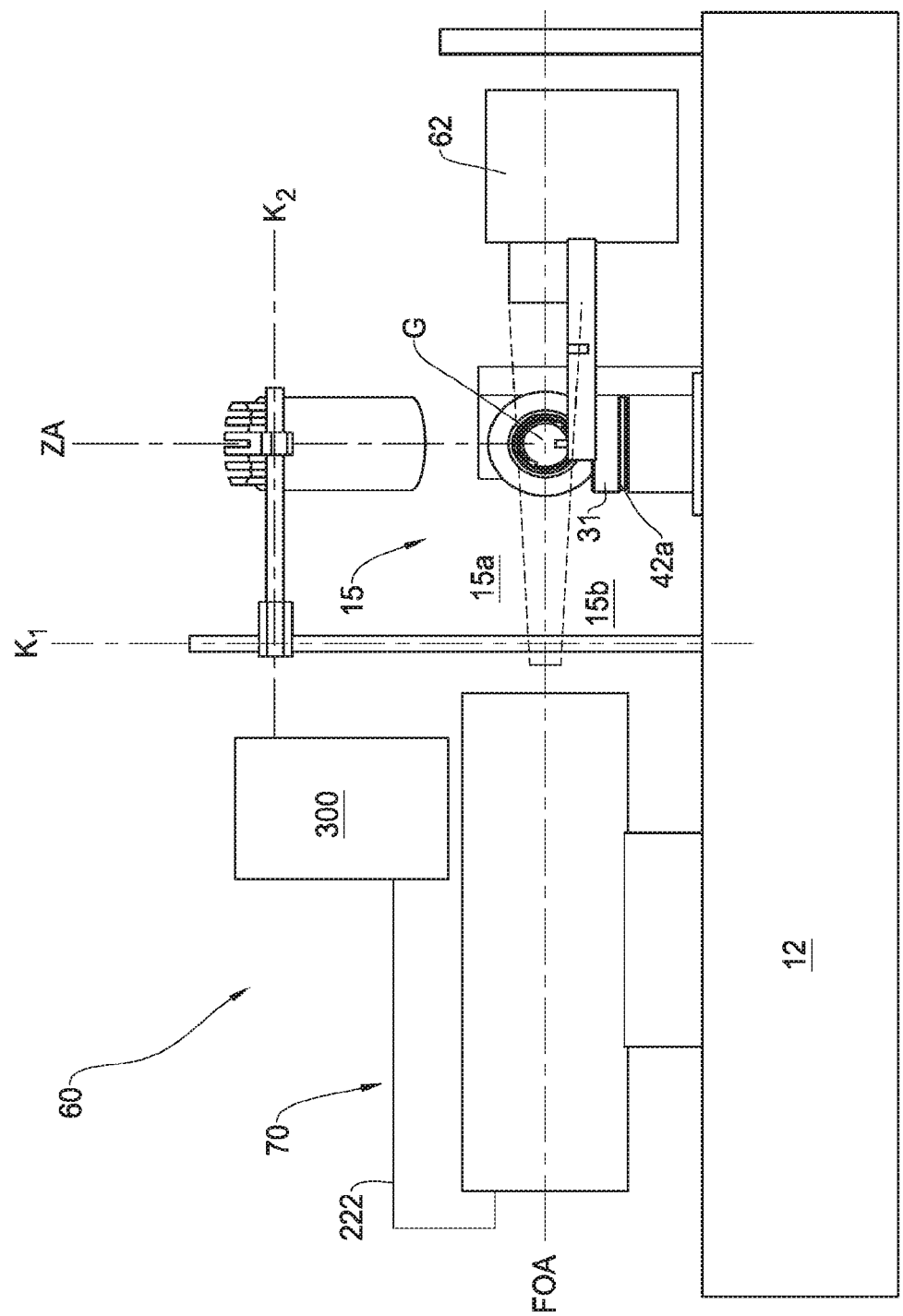

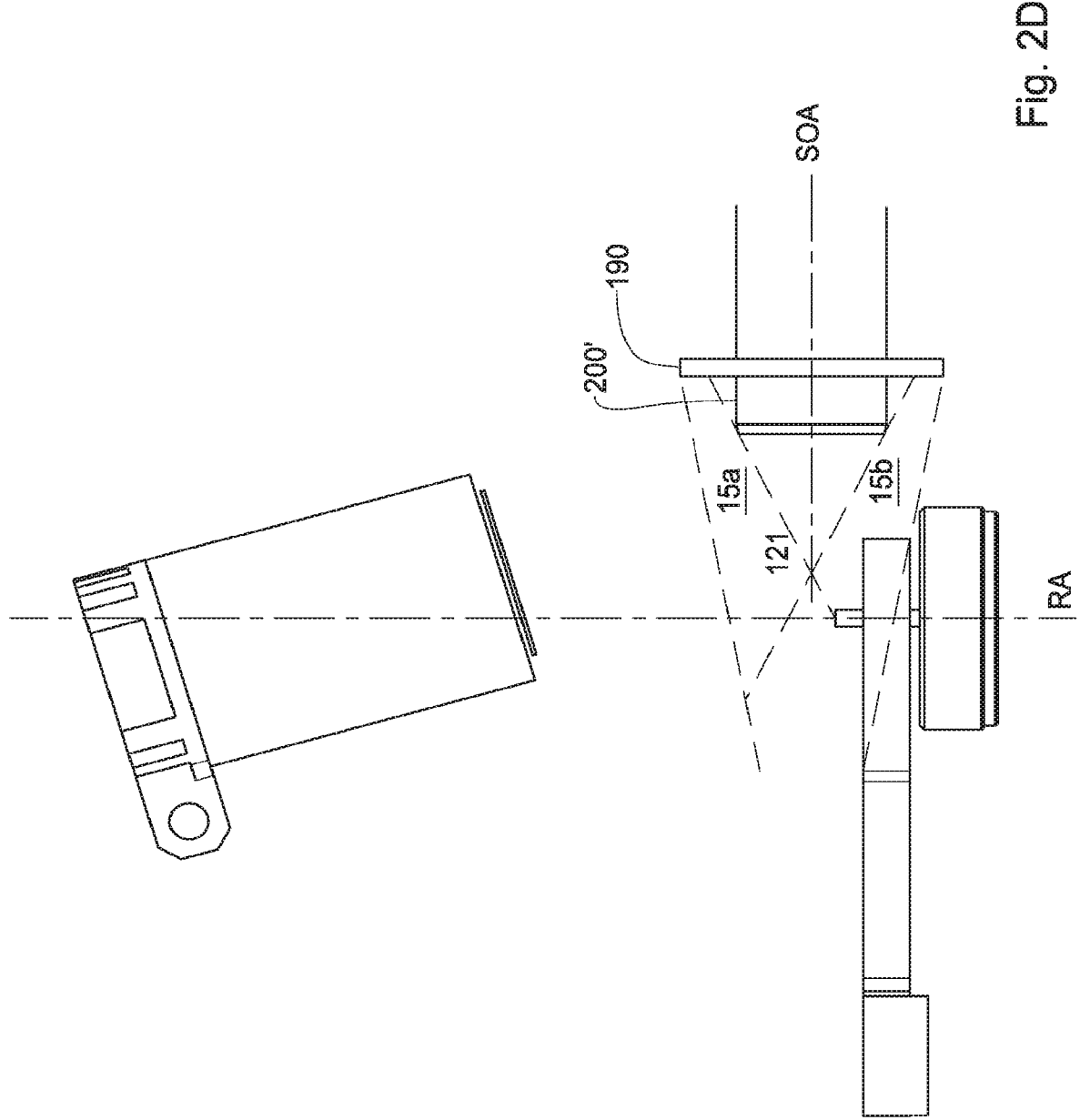

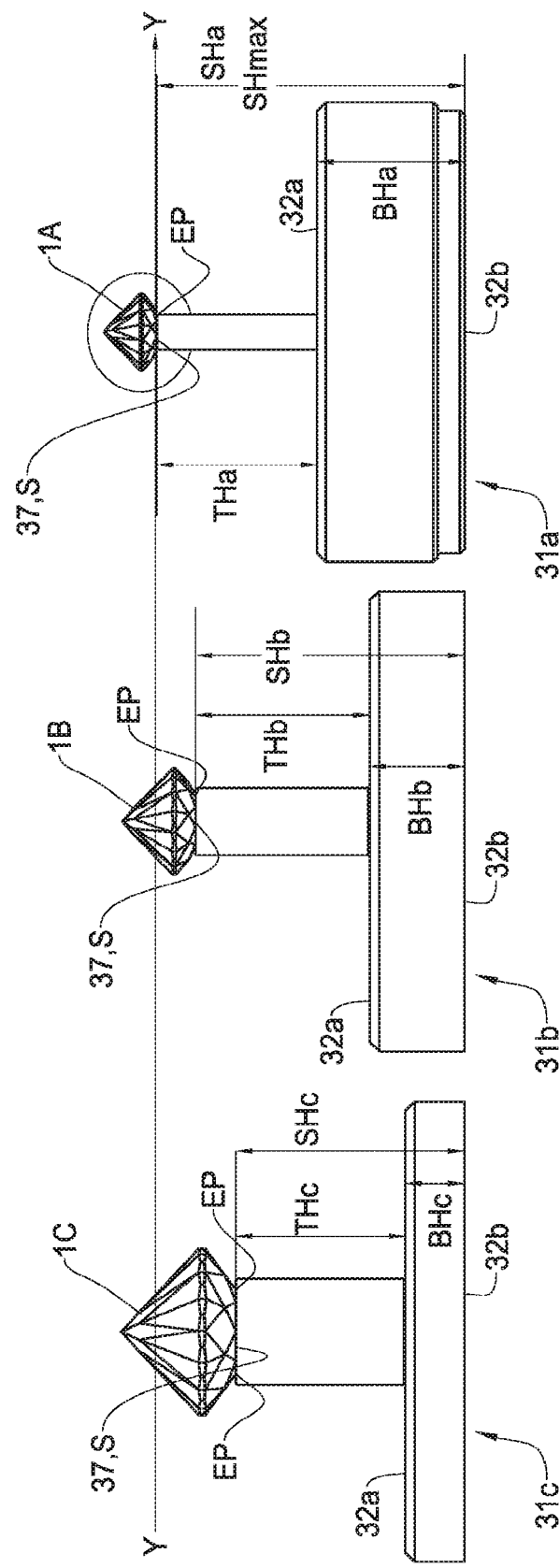

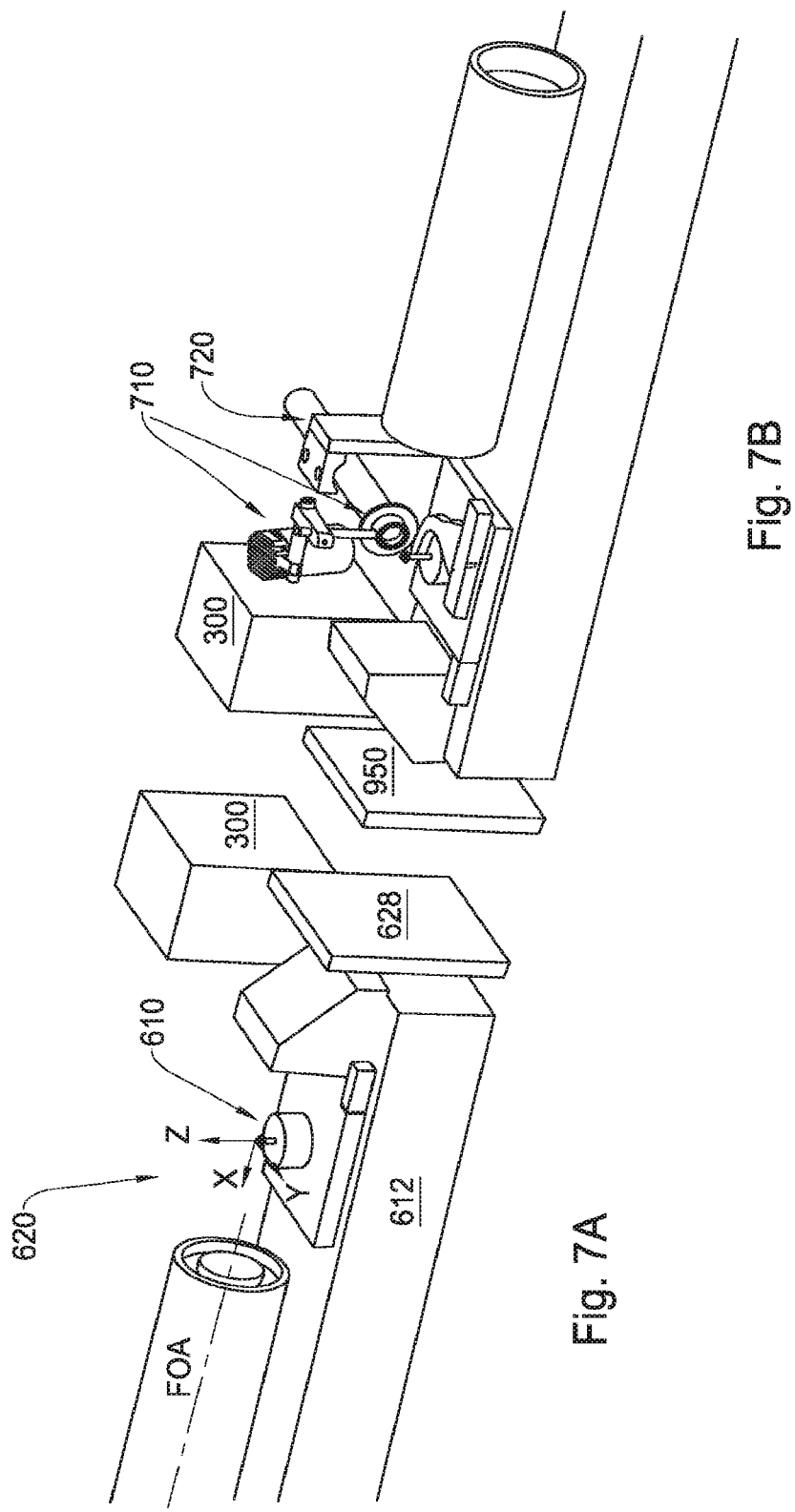

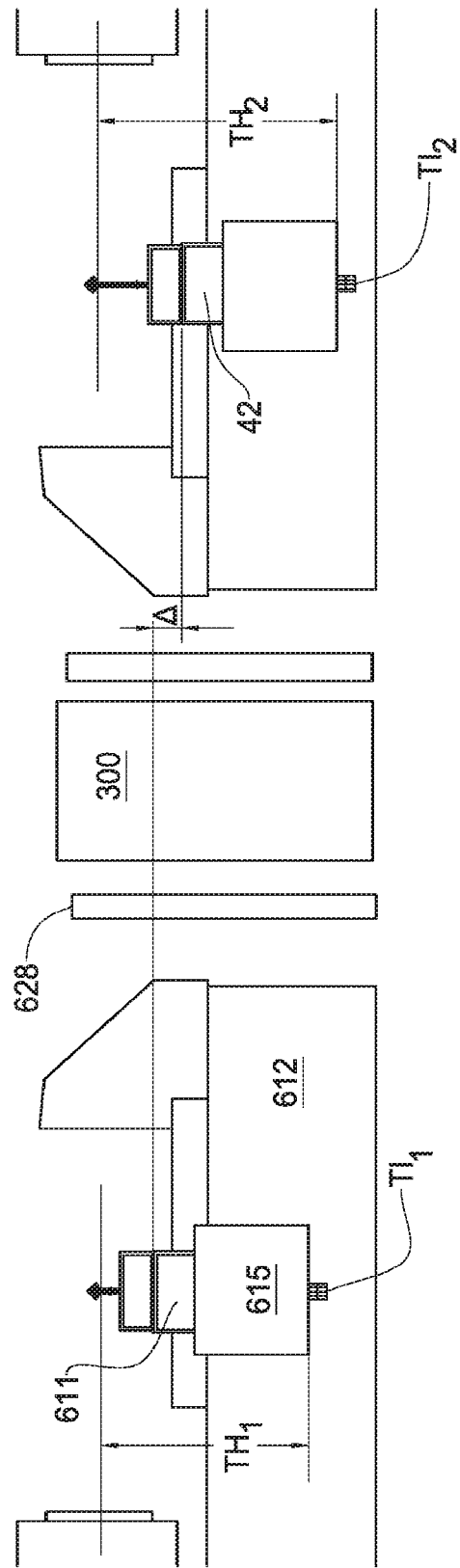

SYSTEM FOR ACCURATE 3D MODELING OF GEMSTONES

RELATED APPLICATIONS

This application is a continuation application of U.S. application Ser. No. 14/653,679, filed Jun. 18, 2015, which is a national stage application of PCT Application No. PCT/IL2013/051041, filed Dec. 19, 2013, which claims priority to Israel Application No. 223763, filed Dec. 20, 2012.

FIELD OF THE DISCLOSED SUBJECT MATTER

The disclosed subject matter pertains to the measurement of gemstones, more particularly, to the computer-aided 3D modeling of gemstones.

BACKGROUND OF THE DISCLOSED SUBJECT MATTER

It is known how important accurate 3D modeling of gemstones, particularly, diamonds, is for allowing diamond manufacturers, wholesalers and gemologists to evaluate the diamonds' proportions, its dimensions as well as its symmetry, inter alia, for the purpose of grading the stones.

WO 99/61890 discloses a method and associated apparatus for measuring a gemstone for its standardized grading. The system gauges the spectral response of a gemstone subject to a plurality of incident light sources within an imaging apparatus. The operation of the imaging apparatus is controlled by an instruction set of a local station control data processor.

U.S. Pat. No. 7,259,839 discloses a method of measuring a physical characteristic of a facet of a diamond, in particular its edges, and obtaining a 3D model thereof including such edges.

SUMMARY OF THE DISCLOSED SUBJECT MATTER

In accordance with one aspect of the presently disclosed subject matter, there is provided a computerized method for producing an accurate 3D-Model of a gemstone comprising:
   a) obtaining an original 3D-model of an external surface of said gemstone, said surface including facets, edges abounding said facets, and junctions each constituting an area of meeting of at least three said edges associated with at least two facets;
   b) imaging at least one selected junction of the gemstone with only portions of its associated facets and edges disposed adjacent the junction, the location of said junction being determined based on information obtained at least partially by using the original 3D model, said imaging being performed under at least one imaging condition different from that at which the original 3-D model was obtained, and under illumination conditions providing such contrast between adjacent facets as allow to distinguish an edge therebetween;
   c) analyzing by the computing system results of said imaging to obtain information regarding details of the gemstone at said junction; and
   d) using by the computing system the information obtained in step c) for producing an accurate 3D-model of said external surface of the gemstone, which is more accurate than the original 3-D model.

The above method of accurate 3D modeling a gemstone is particularly advantageous for modeling cut gemstones, such as for example, polished and semi-polished diamonds, since it allows a much higher accuracy of determination of cut and symmetry parameters of the stones than that provided by conventional 3D modeling techniques, by which the original 3D model can be obtained.

In particular, the above method allows for determination of facet misalignments and more accurate locations and geometry of junctions, compared with the original 3D model, revealing extra edges, facets and junctions not revealed in the original 3D model, as well as superfluous edges, facets or junctions, which were erroneously recorded when producing the original 3D model; thereby the capability of performing fast, accurate and repeatable grading of the stones can be essentially improved, allowing their more objective and more complete certification and—not less importantly—replacing a manual observation by trained gemologists.

Accurate 3D models obtained by the above method can also be used for any other relevant purposes, such as for example: facilitating unique fingerprinting of a stone for any relevant purpose requiring its authentication, and generating high-accuracy ray-traced virtual models thereof, which is particularly advantageous for trading diamonds via e-commerce, to provide higher confidence with regards to their actual appearance.

The method according to the presently disclosed subject matter can comprise performing the steps (b) to (d) above for all junctions revealed in the original 3D model and also, in case the stone is a cut stone, for all non-revealed junctions existing in a predicted/planned geometry of the stone, but absent from said 3D model. Regarding the planned geometry, it is the one, according to which it was supposed to be cut. In connection with predicted/planned geometry, it is defined by a style used when shaping a diamond for its polishing, such as for example, the brilliant cut. The cutting style does not refer to shape (pear, oval), but the symmetry, proportioning and polish of a diamond. The most popular diamond cutting style is the modern round brilliant, whose facet arrangements and proportions have been perfected by both mathematical and empirical analysis. Also popular are the fancy cuts, which come in a variety of shapes-many of which were derived from the round brilliant.

The method can also reveal erroneously recorded junctions, i.e. those that were recorded in the original 3D model, but do not exist in the real cut stone.

The method can also comprise obtaining a plurality of images of the or each selected junction and selecting threamongst at least one selected image, in which one or more edges seen therein are distinguished over the remainder of the image better than in other images.

The method according to the presently disclosed subject matter can also be used to accurately determine the geometry of the stone's girdle and other girdle features such as naturals, extra facets and the like, and thereby generate a more complete accurate 3D model of the stone. In this connection, it should be explained that naturals are areas of the external surface of a cut stone, which have not been polished but rather have been left as they existed in the rough stone, from which the cut stone was shaped for polishing. Extra facets are those that have been cut/polished without them being a part of the planned geometry.

For this purpose, the method according to the presently disclosed subject matter can comprise obtaining one or more images of as many selected portions of the girdle as desired, said one or more images being taken under such conditions as to enable distinguishing at least one planned feature at the or each said selected portion of the girdle; analyzing said one or more images to obtain information regarding details of the girdle at said selected portion thereof; and using said information in generating said accurate 3D-model. The selected portions can be chosen based on the original 3D model or based on any other consideration, and this can be done so that the whole girdle is imaged.

If the analysis of the images of the girdle results in the determination of a new girdle feature, such as an extra facet and/or natural, said information in step (h) can include information regarding at least one new girdle feature absent from the planned girdle geometry; and said presenting in step (i) can include adding a representation of said at least one new girdle feature to the girdle in the accurate 3D model of the stone. Said representation can be a graphical representation added at the corresponding position on the girdle in the accurate 3D model of the stone, e.g. by drawing borderlines of the new feature, and even adding thereto the graphical representation of its appearance as it appears in a corresponding image.

For example, the selection can be based on the determination or prediction of some new girdle feature absent from the original 3D model and from planned girdle geometry, based on the information obtained from the analysis of said one or more images, subsequently identifying a portion of the girdle comprising said new girdle feature and performing further steps with respect to this portion of the girdle constituting said selected portion.

The method according to the presently disclosed subject matter can further comprise predicting a new junction absent from the original 3D model and from the planned geometry of the stone, based on the information obtained in the relevant steps described above; considering said new junction to be a selected junction and performing above steps (b) to (d) with respect thereto. When a new edge is determined, which is absent from the original 3D model, said predicting is performed by associating said new junction with a predicted end of the new edge at its predicted intersection with an edge revealed in said original 3D model.

When, based on the information obtained in the above described method, it is realized that at least one revealed edge present in the 3D model is missing from an image of its associated junction, such missing edge is not included in the accurate 3D model generated by the method.

As mentioned above, the conditions at which the gemstone is imaged for generating its accurate 3D model are different from those, at which images of the gemstone are taken for generating its original 3D model. This difference can be, for example, in at least one of the magnification and resolution, which in the 'accurate' imaging is higher than that, at which the original 3-D model was obtained; or in the depth of focus, which in the 'accurate' imaging can be lower than that, at which the original 3-D model was obtained.

In the above described method, the following steps can be performed for generating the original 3D model of the gemstone (step (a) above):
  illuminating the gemstone by means of one or more step-(a) illumination device,
  imaging the gemstone by means of a step-(a) imaging device, and
  rotating the gemstone relative to the step-(a) illumination device and step-(a) imaging device to obtain a plurality of images, based on which said original 3D model is calculated.

For performing the 'accurate imaging' (in step (b) above), one or more step-(b) illumination devices can be used to illuminate the gemstone, and different portions of the gemstone are imaged by means of a step-(b) imaging device, and wherein at least one of the following conditions is fulfilled:
  at least one of said step-(b) illumination devices provides illumination different from that of said step-(a) illumination device, and
  said step-(b) imaging device is different from said step-(a) imaging device.

The gemstone can be illuminated by means of one or more step-(b) illumination devices with such an illumination that at least three adjacent facets of the crown or the pavilion, or two facets of the crown or the pavilion and the girdle, are each at least partially illuminated with such a contrast between at least one couple of their adjacent illuminated surfaces as to enable distinguishing an edge therebetween. Such contrast can be obtained by at least one of the following:
  said illumination being uniformly diffusive along the entire field of vision of an imaging system used in step (b);
  said illumination having a chief ray with an angle of incidence selected based on an average between angles defined by said at least three facets or two facets and the girdle, with said axis Z;
  said illumination being provided by an illumination source using contrast improving techniques optionally comprising a mask interacting differently with light exiting from said illumination source at different surface portions of said mask, including at least one of the following:
    at least two surface portions with distinct absorption properties,
    at least two surface portions with different polarization properties, and
    at least two surface portions that provide different propagation properties of the light.

The number of the above surface portions can correspond to the number of facets in the field of vision.

According to a further aspect of the presently disclosed subject matter, there is provided a system configured for producing an accurate 3D-Model of a gemstone by the method described above.

In accordance with a still further aspect of the presently disclosed subject matter, there is provided a computerized system for automatically producing an accurate 3D-model of a gemstone, comprising
  a 3D modeling system configured for obtaining an original 3D model of an external surface of a gemstone, including facets, edges abounding said facets, and junctions each constituting an area of meeting of at least three said edges associated with at least two facets;
  an illumination and imaging system configured for imaging at least one junction selected from the junctions in said 3D model, with only portions of its associated facets and edges disposed adjacent the junction, under at least one imaging condition different from that at which the original 3D model was obtained, and under illumination conditions providing such contrast between adjacent facets as to allow to distinguish an edge therebetween; and
  a computing system configured to analyze results of said imaging to obtain information regarding details of the gemstone at said junction and to use the obtained information for producing an accurate 3D-model of said external surface of the gemstone, which is more accurate than the original 3-D model In accordance with a still further aspect of the presently disclosed subject matter, there is provided method of upgrading a first system configured for obtaining an original 3D model of an external surface of a gemstone, in order to provide a second system for producing a more accurate 3D model of the external surface of said gemstone than the original 3D model; said method comprising the steps of:

adding to said first system a second illumination system and a second imaging device configured for imaging at least one junction with only adjacent portions of its associated facets and edges, the location of said junction being determined based on information obtained at least from the original 3D model, said imaging being performed with at least one imaging condition being different from that or those at which the original 3-D model was obtained, and under illumination conditions providing such contrast between adjacent facets as allow to distinguish an edge therebetween; and adding computing capability for:
  analyzing said images to obtain information regarding details of the cut gemstone;
  using said information for obtaining said more accurate 3D-model of the external surface of the gemstone.

Said imaging condition can be at least one of the following:
  a magnification higher than that provided by an imaging device with which the original 3D image has been obtained;
  a resolution higher than that provided by the imaging device with which the original 3D image has been obtained; and
  a depth of focus lower than that provided by the imaging device with which the original 3D image has been obtained.

In accordance with a further aspect of the invention, there is provided a system In accordance with a still further aspect of the present invention, there is provided a kit for upgrading a first system configured for obtaining an original 3D model of a gemstone, in order to obtain a second system for producing a 3D model of said gemstone which is more accurate than the original 3D model, said first system comprising a first set of gemstone holders each having a first gemstone mounting surface, a first illumination source and a first imaging device, said kit comprising at least the following:
  at least one second illumination source different from the first illumination device; and
  a second imaging system different from the first imaging system.

The kit can further comprise a second set of gemstone holders each having a second gemstone mounting surface and being configured for mounting on a stage base such so as to allow an access of said second illumination source to a space between said second gemstone mounting surface and the stage base.

Alternatively, the kit can comprise means configured to use the first set of gemstone holders in such a way as to allow an access of illumination from said illumination source to a space below between said first gemstone mounting surface.

The kit can further comprise a non-transitory computer readable storage medium comprising computer readable program code embodied therein, the computer readable program code causing the system for accurate 3D modeling of gemstones to operate as detailed herein.

Additional possible features of different aspects of the presently disclosed subject matter are presented in the detailed description of embodiments and the claims.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A is a side view of the system shown in FIG. 1A, seen facing the X-axis;

FIG. 2D is a schematic partial side view of the system of FIG. 1A, showing one example of its girdle illumination device;

FIGS. 3A-3C show a schematic view of different gemstone holders with gemstones of different sizes mounted thereon for producing their accurate 3D-models by the system shown in FIG. 1A;

FIG. 7A to 7D schematically illustrate, in perspective and side views, a process of upgrading an original 3D modeling system (FIG. 7A, 7C) to obtain a system (FIG. 7B, 7D) for producing an accurate 3D-model of a gemstone, in accordance with one example of the presently disclosed subject matter.

DETAILED DESCRIPTION OF EMBODIMENTS

Figure 1A:
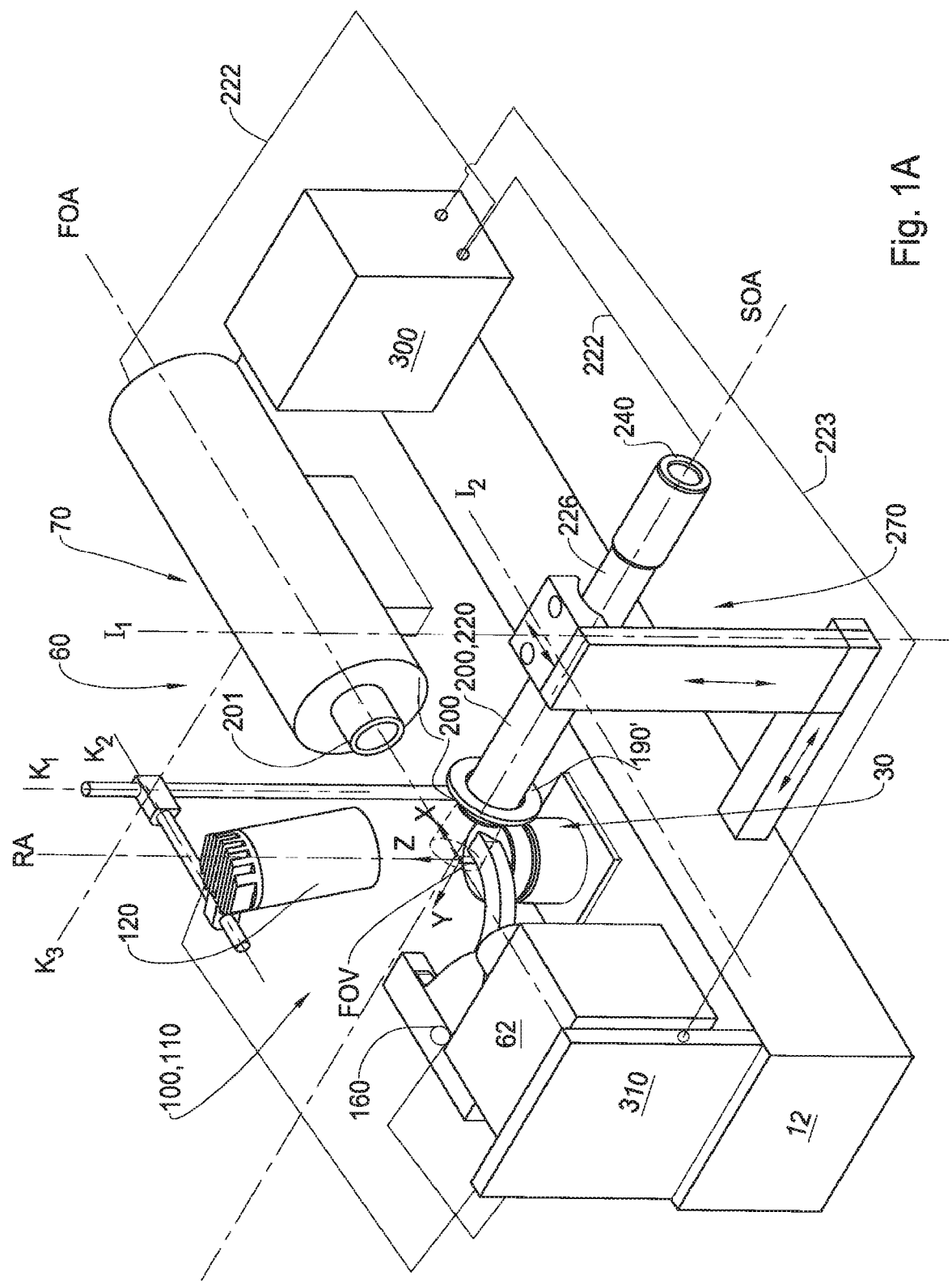
FIG. 1A is a schematic perspective view of a system for producing an accurate 3D-model of a gemstone, in accordance with one example of the presently disclosed subject matter.

FIG. 1A schematically illustrates one example of a system 10 for producing an accurate 3D model of an external surface of a gemstone G cut in accordance with planned cut geometry to have a crown, a pavilion, a girdle and a table, the crown and the pavilion having planned facets, edges abounding the facets, and junctions, each constituting an area of meeting of at least three such edges associated with at least two facets.

Whilst the gemstone's planned cut geometry is known, the gemstone's real geometry and, particularly, the geometry of its pavilion, crown and girdle is what the system 10 is aimed to determine with a high accuracy, by:

obtaining an original 3D-model of said gemstone, imaging junctions with only adjacent portions of their associated facets and edges, the junction's location being determined based on information obtained at least partially by using the original 3D model, with at least one of magnification and resolution being higher and/or depth of focus being lower than those at which the original 3-D model was obtained, and under conditions providing such contrast between adjacent facets as allow to distinguish an edge therebetween; and analyzing results of the above imaging to obtain information regarding details of the gemstone at said junctions; and using this information for producing a new 3D-model of the gemstone which is more accurate than the original 3-D model.

In the currently disclosed example, a brilliant-cut diamond is considered as the gemstone to be modeled, though this is a purely explanatory necessity, and there may be a number of possible gem cut geometries that can be analyzed by the currently disclosed system. In fact, any cut of a gemstone can be modeled by the system, as long as it offers one resting surface, on which the gemstone can be placed for the analysis.

Figure 1B:
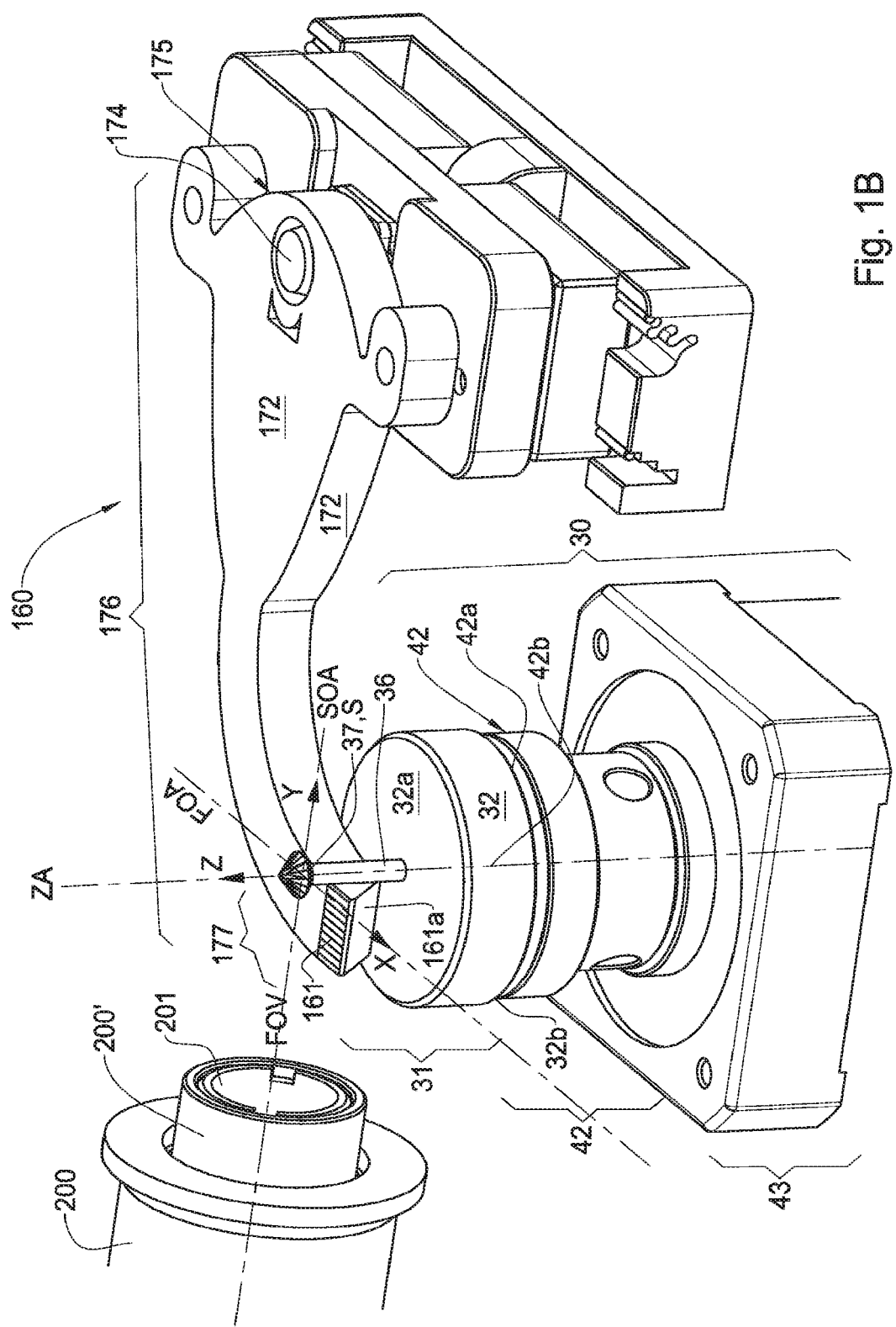
FIG. 1B is a perspective view of a stage and the crown illumination device of the system shown in FIG. 1A.

With reference to FIGS. 1A, 1B the system 10 comprises a stage station 30 for supporting the gemstone G, a first 3D modeling system 60 with a first optical axis FOA, for producing an original 3D model of the gemstone, and a second 3D modeling system 100 with a second optical axis SOA, for producing an accurate 3D model of the gemstone at an augmented accuracy level compared to that of the original 3D model.

The stage station 30 and the first and second 3D modeling systems are all fixedly mounted on a system base 12, with a system cavity 15 formed therebetween, configured for receiving therein the gemstone G supported at its resting or mounting surface S (see FIG. 4) by the stage station 30 so as to allow to both 3-D modeling systems to have an optical access to any surface of the gemstone except for its resting surface, without removing the gemstone from the stage station.

The first and second 3D-modeling systems 60 and 100 are mounted on the base 12 such that the spacial relationship of the first optical axis FOA to the base 12 remains constant, while the second optical axis SOA can move during operations of the system, as described in further detail hereinbelow.

It has to be stressed, that the disposition of the second 3D modeling system 100 relative to the first 3D modeling system 60 as shown in this example is purely by way of a non-binding, explanatory exposition for the purpose of understanding the herein disclosed subject matter, and that any other relative disposition of the 3D modeling systems in relation to each other is entirely possible.

The system 10 further comprises a computer system 300 comprising a processor (not shown) operatively coupled to a memory (not shown) storing appropriate software and a control card 310, which is so connected to the above system's components on the one hand, and the computer system 300 by way of connection line 223 on the other, as to allow for necessary controlling all their operations.

Unless specifically stated otherwise, as apparent from the following discussions, it is appreciated that throughout the specification discussions utilizing terms such as "process-ing", "computing", "calculating", "generating", "configuring", "controlling", "choosing", "building", "deciding" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, the computing system 300 disclosed in the present application.

The computerized operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

It is noted that the control card 310 can be integrated with the computer system 300. Additionally or alternatively, the functions of the control card (or part of them) can be distributed between all or some of the components of the system 10.

The system's components will now be described separately in more detail with reference to the corresponding drawings.

The Stage Station 30

With reference to FIGS. 1A and 1B, the stage station 30 comprises:

a replaceable gemstone holder 31; and a stage base 42 with a drive stepper motor 43 so as to be rotatable by the motor 43 about an axis of rotation RA.

The stage base 42 has a holder mounting surface 42a, at which the gemstone holder 31 is mounted, disposed at a constant height relative to the system base 12. The first optical axis FOA of the first 3-D modeling system 60 intersects with the axis of rotation RA at the origin of the relative Cartesian coordinate system RCCS of the system 10, the X-axis coinciding with the FOA and the Z-axis coinciding with the RA.

Figure 2B:
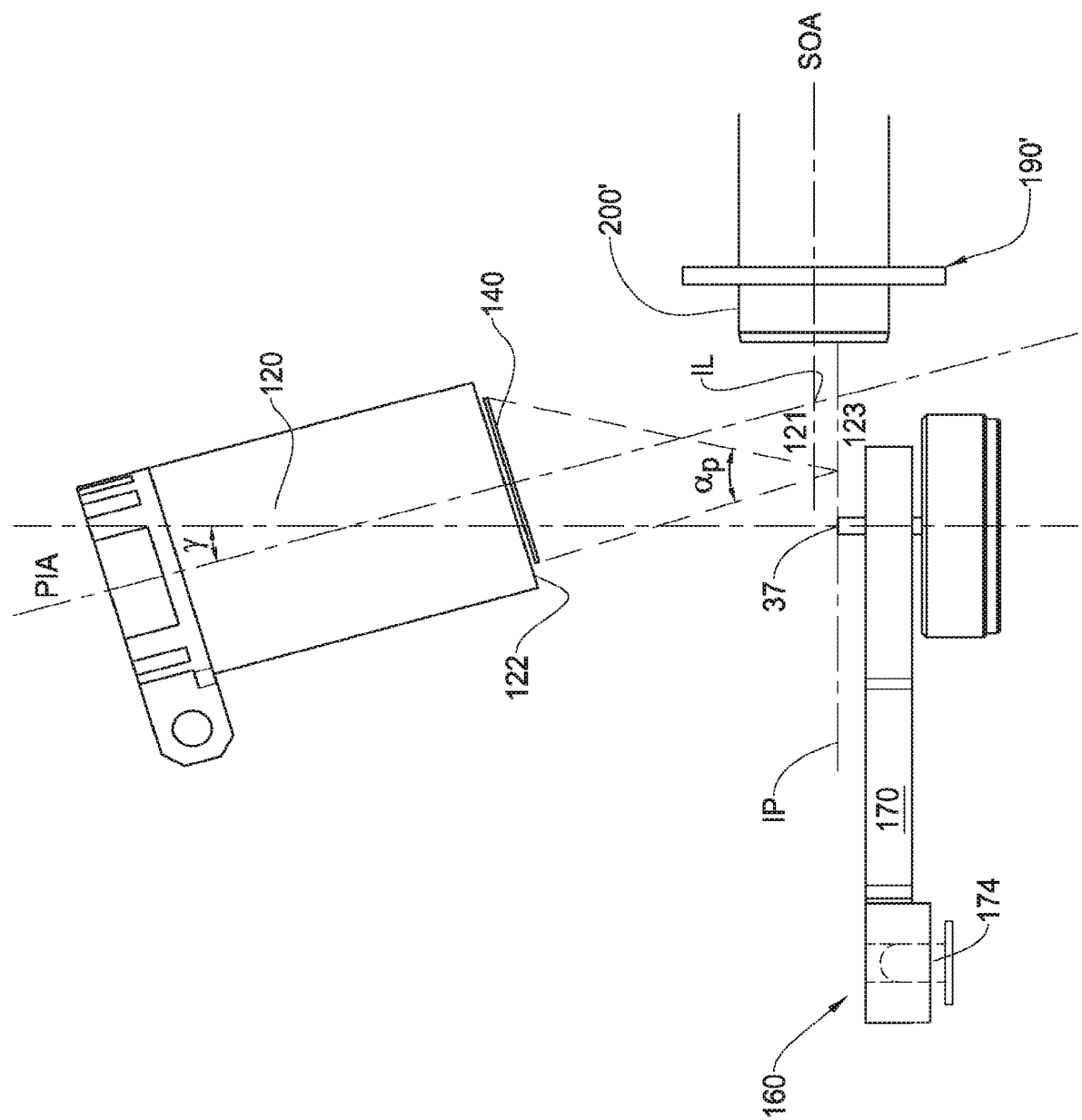
FIG. 2B is a schematic partial side view of the system of FIG. 1a, showing its pavilion illumination device.

The replaceable gemstone holder 31 comprises:

a holder base 32 with a holder base upper surface 32a and a holder base lower surface 32b; and a tower stage 36 integrally mounted on the holder base upper surface 32a with its one end and having at its other end a gemstone supporting surface 37 configured for contacting the resting surface S (best seen in FIG. 4) of the gemstone when mounted thereon and defining an illumination plane IP (best seen in FIG. 2B) parallel to the XY plane of the RCCS of the system 10. With reference to FIG. 2A, The X-Y plane of the RCCS separates the space within the cavity 15 into a gemstone space 15a disposed above, and a stage space 15b disposed below, the plane of the gemstone supporting surface, with respect to vertical, gravity direction.

It should, however, be noted that such vertical orientation of the tower stage and the gemstone is not the only one possible. Any other appropriate orientation can be used with corresponding special arrangement for holding gemstones, as known in the art.

Reverting now to FIGS. 1A and 1B, the holder base lower surface 32b is configured for detachable fitting thereof to the holder mounting surface 42a of the stage base 42 so as to lock the holder 31 to the stage base 42 in a position that the tower stage 36 of the holder is coaxial with the axis of rotation RA and the axis Z of the system 10.

The gemstone holder 31 is selected from a set of holders 31a to 31n corresponding to several gemstone size groups A to N to be modeled with the system 10. FIG. 3 schematically illustrates three such gemstone holders 31a, 31b, 31c corresponding to three gemstone size groups A, B, C. Each size group is defined by a range of carat weights for which the corresponding holder size is suitable. Gemstones 1A, 1B, 1c in FIG. 3 each respectively represents a stone from one of the respective size groups A, B, C.

The main difference between the different holders 31a to 31n is in the gemstone support height SH, at which the gemstone supporting surface 37 is located relative to the holder base lower surface 32b, and which in different holders is, respectively, SHa to SHn so as to ensure that the larger the size of a gemstone, the lower it is mounted relative to the holder base, i.e. the shorter the height SH. In other words, among the holders 31a to 31n, the holder with a maximal height SHmax is configured to support the smallest gemstones which the system 10 is configured to model. With the thickness of the holder base 32 (i.e. the distance between its upper and lower surfaces 32a and 32b) being BH, the height of the tower stage 36 (i.e. the distance between the gemstone supporting surface 37 and the upper surface of the holder base 32) being TH, and the gemstone total support height being SH=TH+BH, the difference between different gemstone support heights SHa to SHn of different gemstone holders is obtained in the described example by providing the corresponding different heights BHa to BHn of the gemstone holders 32, and keeping constant the height TH of the tower stage 36.

Figure 4:
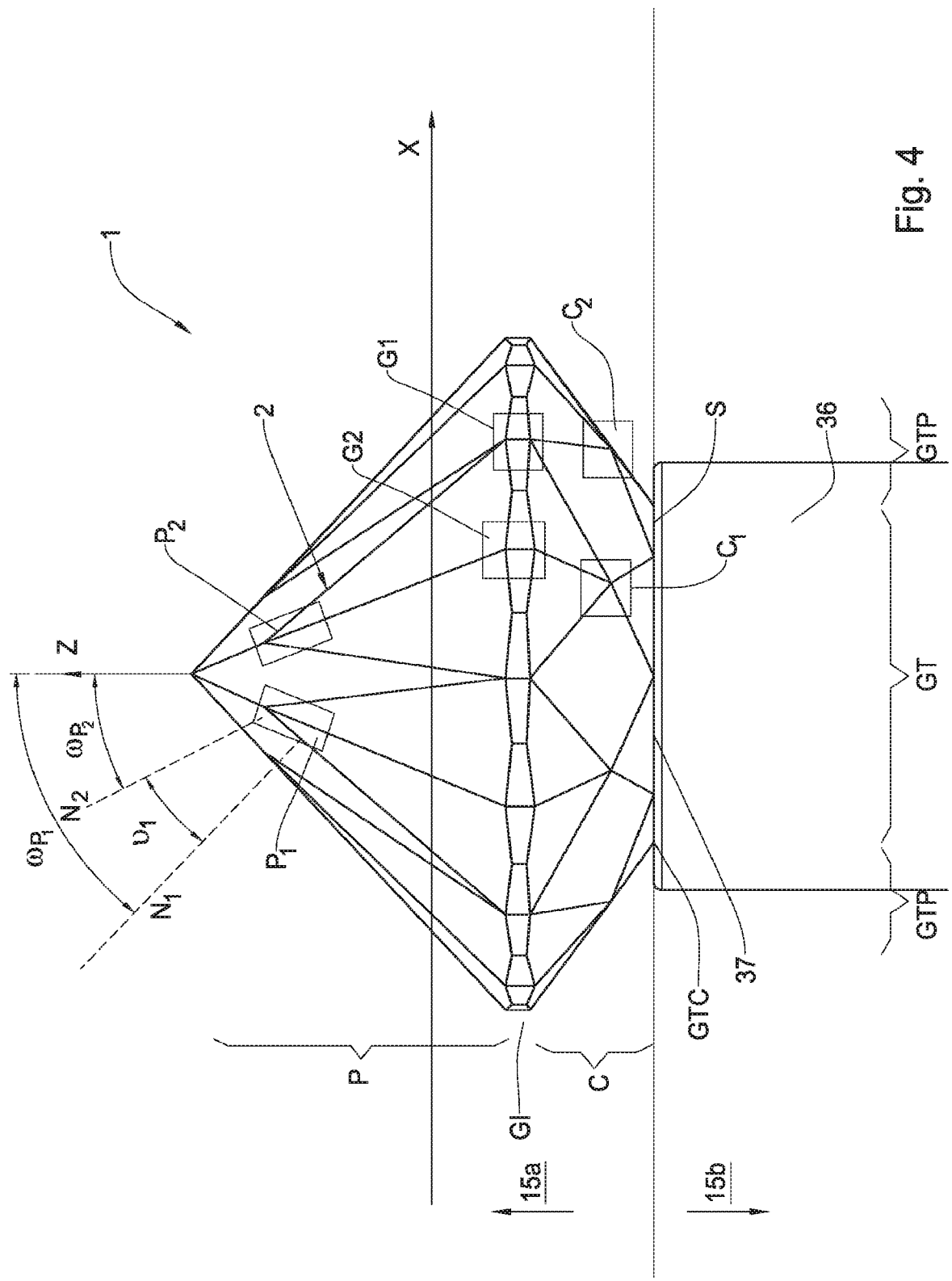
FIG. 4 is a schematic view of a gemstone mounted on a support surface of one of the holders shown in FIG. 3.

In addition, the gemstone holders 31a to 31n differ in the area of their gemstone supporting surfaces 37, which is greater for the groups of gemstones which have greater sizes, and which is such as to ensure that any surface of the gemstone that is adjacent to its resting surface S but is other than the resting surface, protrudes radially from the gemstone supporting surface 37 when the gemstone is mounted thereon. Exemplary, each of the gemstones shown in FIGS. 3 and 4, is so mounted on the gemstone supporting surface 37 of the tower stage 36 that its resting surface S is constituted by a central portion of its table GT whilst the periphery of the table GTP and edges GTC of its intersection with the gemstone's crown C protrude radially from the gemstone supporting surface 37.

It needs to be noted that, while the above described configuration with several holders 31n is one option for achieving the goal of placing the gemstone in the necessary position for analysis, other appropriate arrangements can be used. For example, instead of a plurality of holders 31n, there can be configured a tower stage 36 which is displaceably mounted within stage base 42, such that it can displace a gemstone along the Z-axis, and its support surface 37 can be either constant in diameter, or can be adjustable in its diameter.

As seen, in the present example the gemstone's resting surface is its table. However it should be understood that such orientation of the gemstone is not obligatory and it can be mounted in the system in any other appropriate orientation. In addition, it should be understood that the orientation of the entire stage station or of its selected components including the gemstone supporting surface 37 can be other than that shown in the drawings.

The system 10 can further comprise a displaceable centering mechanism 50, having a centering axis, which is configured for being:

placed in its operative, centering position in which it can receive therein and center, on the gemstone supporting surface 37, the gemstone G so that the centering axis of the centering device coincides with the rotation axis RA and axis Z of the system 10, and subsequently displaced from its centering position to take its inoperative position at a location spaced from the gemstone supporting surface 37 and from the space between holder base 32 and the gemstone supporting surface 37.

The First 3D Modeling System 60

The first 3D modeling system 60 can be of any known type configured for the conventional computer calculation of a 3D model of the gemstone G, and it can be, for example, DiaMension™ system produced by Sarin Technologies Ltd., Israel, to which the description below particularly refers.

As shown in FIGS. 1A and 2A, the system 60 includes a backlight illumination unit 62 and an imaging device 70 aligned along the first optical axis FOA, both mounted on the system base 12 on opposite sides relative to the gemstone supporting surface 37, so as to enable the imaging system 70 to scan the outer surface of the gemstone G when mounted on the gemstone mounting surface 37 and rotated by the stage base 42, and obtain thereby a plurality of electronic images of the silhouettes of the gemstone surface in different angular positions of the gemstone relative to the axis Z, and to transfer the obtained electronic images via direct line 222 to the computer system 300 configured to calculate the original 3D model of the gemstone.

The computer system 300 can be implemented as a separate system component operatively connected to other system components or can be, at least partly, distributed over some or all of the system components. The detailed below functions of the computer system 300 can be implemented in any appropriate combination of software, firmware and hardware.

The optical axis FOA of the first modeling system 60 intersects the axis Z at the XY plane, spaced along the Z axis from the holder supporting surface 42a of the stage base 42, to a constant distance, which exceeds the maximal support height SHmax. Due to this and due to the use of the gemstone holders 31a to 31n, which provide gemstones of different sizes with different support heights SHa to SHn, it is ensured that any gemstone among those for the modeling of which the system 10 is designed, disposed on the gemstone supporting surface 37, will be fully in the field of view FOV60 of the imaging system 70 during its operation.

The Second 3D Modeling System 100

Reverting to FIG. 1A, the second 3D modeling system 100 comprises a second illumination system generally designated as 110, and a second imaging device 200 configured for obtaining images of small areas on the pavilion, crown or girdle of the gemstone G, with at least one of a magnification and resolution being higher, and/or depth of focus being lower, than those provided by the first imaging device 70. Examples of such areas are shown in FIG. 4, illustrating a gemstone G mounted on a tower stage 36, supported by the gemstone supporting surface 37 along its resting surface S. The areas shown in FIG. 4 are areas P1 and P2 of the pavilion P of the gemstone, C1 and C2 of the crown of the gemstone, and G1 and G2 of the girdle GI of the gemstone.

As seen in FIG. 1A, the second illumination system comprises a plurality of illumination sources 120, 160 and 190' differently disposed relative to the second imaging device 200, which disposition is such as to allow the illumination sources to direct their illumination to a space within the cavity 15 of the system 10, between the rotation axis RA and a proximal end 200' of the second imaging device 200 in order to illuminate at least areas of the pavilion, crown and girdle of the gemstone G, which are closest to the second imaging device 200.

Figure 2C:
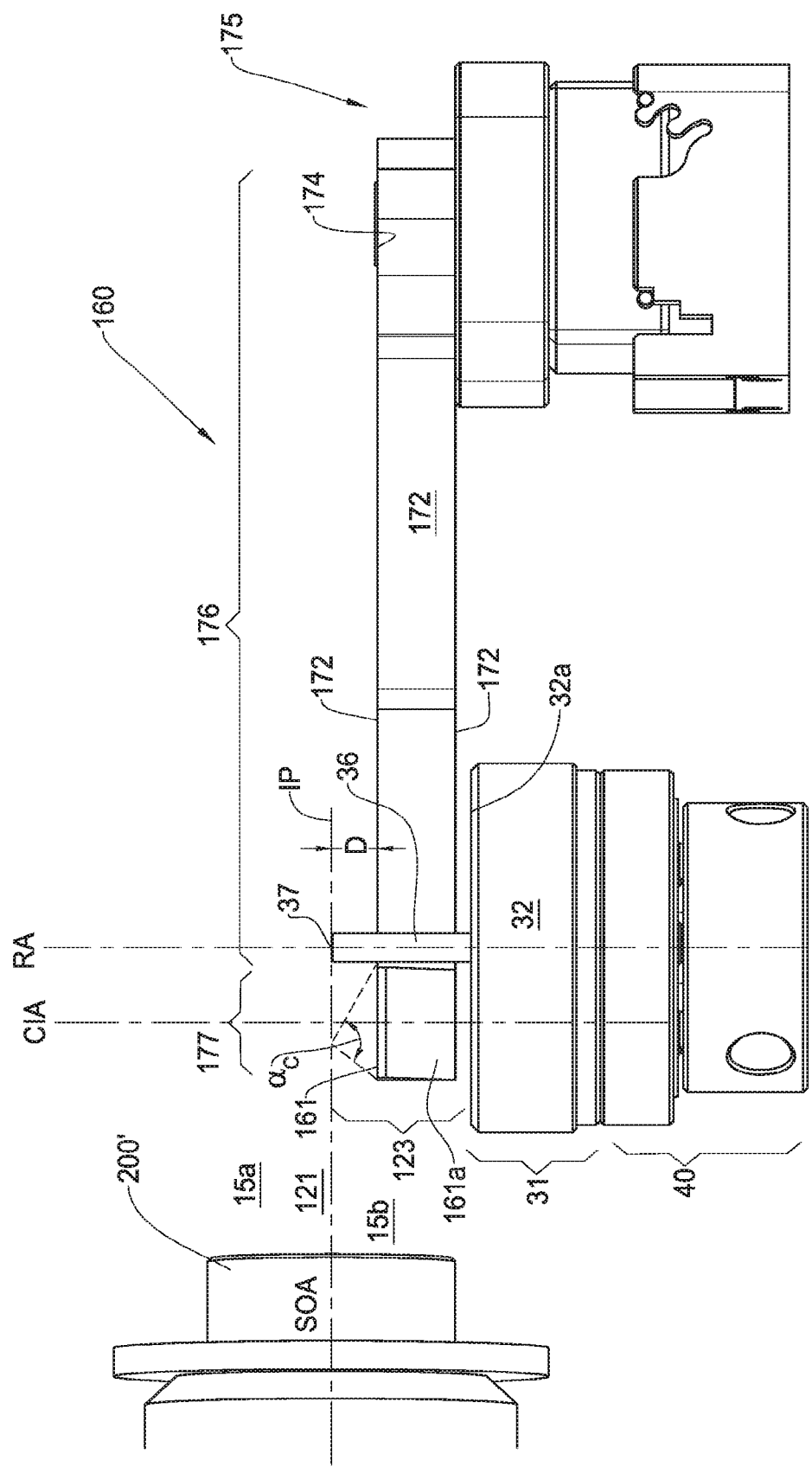
FIG. 2C is a schematic partial side view of the system of FIG. 1A, showing its crown illumination device.
Figure 2E:
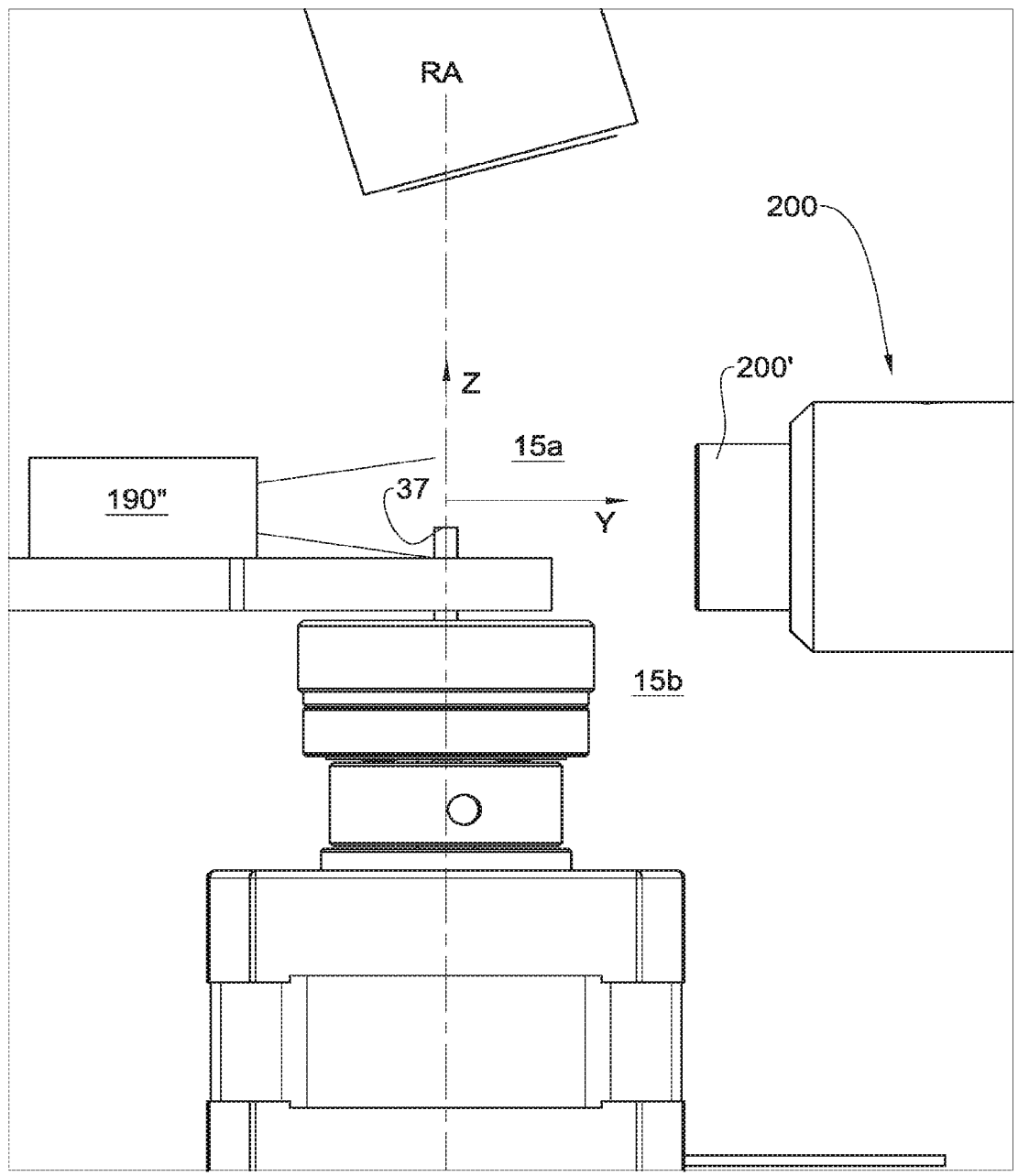
FIG. 2E is a schematic partial side view of the system of FIG. 1A, showing another example of its girdle illumination device.

With reference to FIGS. 2B to 2E (illustrating different parts of the system 10 without the gemstone G), the second illumination system 110 thus comprises:

a) a pavilion illumination device 120 best illustrated in FIG. 2B, disposed in the gemstone space 15a of the system cavity 15 above the gemstone supporting surface 37 so as to illuminate at least a portion 121 of space between the rotation axis RA and the proximal end 200' of the second imaging system 200, adjacent to the gemstone supporting surface 37.

b) a crown illumination device 160 best seen in FIGS. 1B and 2C, in the form of a light guiding body having a light exit surface 161, movable between an inoperative position thereof (not shown), in which it is spaced from the system cavity 15, and an operative position, in which the light exit surface 161 is disposed in the stage space 15b of the system cavity 15 below the gemstone supporting surface 37, so as to illuminate at least a portion 121 of space between the gemstone supporting surface 37 and the proximal end 200' of the second imaging system 200, adjacent to the gemstone supporting surface 37; in particular, when moving from its inoperative to its operative position, the light exit surface 161 of the crown illumination device 160 is at least partially brought into a region 123 between the gemstone holder base 32 and the gemstone supporting surface 37, thereby ensuring that the light exit surface 161 is disposed at a constant distance D from the gemstone supporting surface 37 irrespective of the size of holder 31 or the gemstone.

c) A girdle illumination device, two different examples of which are shown in FIGS. 2D and 2E; the girdle illumination device 190' shown in FIG. 2D is disposed adjacent the proximal end 200' of the second imaging device 200 at a constant spacial relationship with the proximal end 200', so as to traverse at least a portion of the space 121 between the rotation axis RA and the proximal end 200' of the second imaging system 200, and illuminate the gemstone space 15a above and adjacent to the gemstone supporting surface 37, potentially from both the stage space 15b and the gemstone space 15a; the girdle illumination device 190" shown in FIG. 2E is disposed on the side of the gemstone supporting surface 37 opposite the proximal end 200' of the second imaging device 200, so as to illuminate at least the gemstone space 15a above and adjacent the gemstone supporting surface 37.

The girdle illumination device can be configured to provide illumination of any appropriate type, such as for example, diffused illumination.

In order to increase contrast between adjacent facets of the pavilion and/or crown when imaged by the second imaging device 200, any one of the pavilion and crown illumination devices can be configured to produce a uniformly diffusive light beam, and can be so spaced from the gemstone supporting surface 37 along the rotation axis RA, so as to provide a respective predetermined opening angle $\alpha_p$, $\alpha_c$ of its light when incident on the illumination plane IP coincident with the support surface 37.

Referring now to FIG. 4 specifically, the opening angle $\alpha_p$, $\alpha_c$ is determined in correspondence with angles $\sigma_i$ formed by normals $N_i$ to facets that are adjacent to each other, which facets are expected to be in the field of view P1 of the second imaging device 200, with respect to each other (see FIG. 4, $N_1$ and $N_2$; $\sigma_1$) and to the pavilion or crown illumination axis PIA or CIA (see FIG. 4, $\omega_p$ for example), respectively. All these angles are known from the planned cut geometry of the gemstone and, thus, the value of the opening angle can be obtained empirically for stones of the same or similar planned cut geometry. There can thus be provided a table presenting different positions of the pavilion/crown illumination device per planned cut geometry, and adjustment of such position can be performed manually by the user or automatically.

Reverting to FIG. 2B, a pavilion illumination axis PIA is defined by the central normal of a light exit surface 122 of the device 120, forming an acute angle $\gamma$ with the rotation axis RA and intersecting the optical axis SOA at a location IL within the space 121 between the gemstone supporting surface 37 and the proximal end 200' of the second imaging device 200. A crown illumination axis CIA, which is normal to the light exiting surface 161, intersects the axis SOA at a location between the tower stage 36 and the distal end 200' of the second imaging device 200.

In one specific example, the pavilion illumination device 120 can comprises a plurality of LEDs at one end thereof, with respective lenses and diffuser elements causing the light to exit from the device 120 as described hereinabove in a diffused light beam.

In addition, the pavilion illumination device 120 can be provided with a contrast enhancing mask 140 disposed adjacent its light exit surface 122, directed to provide a non-uniform illumination pattern in the space 121, and thereby increase a contrast between adjacent facets. By way of non-limiting examples, such mask can have at least one of the following:

i. areas exhibiting distinct absorption properties;
ii. differently polarizing areas;
iii. areas providing different light propagation properties.

The number of areas in the above pattern can correspond to the number of facets expected to be in the field of vision of the imaging device 200.

Figure 5:
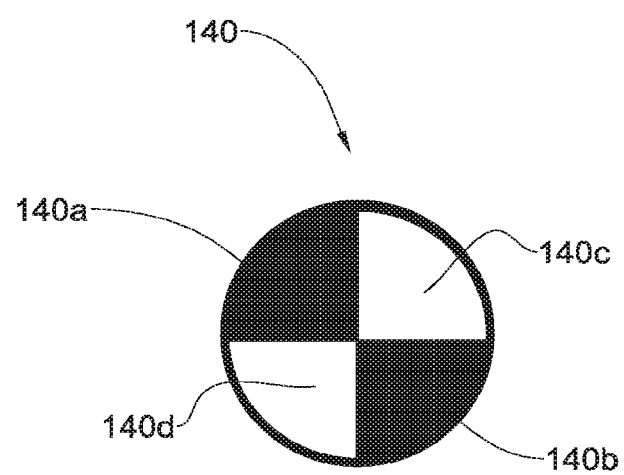
FIG. 5 is a schematic view of one example of a mask, which can be used in one of the illumination devices of the system shown in FIG. 1A.

One example of the mask 140 designed in accordance with option (i) above is shown in FIG. 5, in which segments 140a and 140b are configured to fully absorb, and segments 140c and 140d are configured to fully transmit, light exiting from the pavilion illumination source 140.

In the described system, by way of non-limiting example only, the crown illumination device is in the form of a light guide 170 with a proximal end 175 configured for receiving a light source, such as a LED 174, so that it emits light within the light guide, a distal end 177 configured for emitting light reaching the distal end toward the portion 121 of the space located between the gemstone supporting surface 37 and the proximal end 200' of the second imaging system 200, and an intermediate portion 176 therebetween via which the light emitted from the light source propagates by multiple reflection thereof from the light guide surfaces 172, which can be provided with a reflective coating. The distal end 177 of the light guide can be provided with means, such as a diffusive coating or plate 161 configured to uniformly diffuse light exiting therefrom.

The crown illumination device can also be enhanced by masking the light exit surface 161 according to the same principles and details described above for the pavilion illumination device 120.

It is furthermore clear to the skilled person, that the above described light guide 170 of the crown illumination device 160 is only one specific, non-binding example of numerous strategies for illuminating a gemstone mounted on stage 31 from below.

There are many other ways of achieving the same goal, for example, amongst others, by placing an OLED at the location of light exiting surface 161, or concentrating the light of more than one LED by a single light guide of a different form, or using fiber optics, only to name three more examples.

If desired, the illumination devices can be provided with degrees of freedom required to obtain their desired position and effect. As shown in FIG. 1A, in the described example, the degrees of freedom for the pavilion illumination device 120 can be provided by the possibility of moving the same in at least one of the following manners: translation along a first axis K1 parallel to the Z-direction, rotation about a second axis K2 that is perpendicular to a plane passing through the Z axis and the second optical axis SOA, and translation along a third axis K3 parallel to axis Y.

The computer system 300 can control respective devices of the system via control card 310. In the described example, this concerns all devices except for the electronic imaging devices, as described further and hereinabove, which in the described example is connected to the computer system 300 by direct communication lines 222. However, this does not need to be the case and should be seen as optional.

The second imaging system 200 will now be described in more detail, with reference to FIG. 1a.

The second imaging device 200 comprises an optical system 220 and an electronic imaging device 240 (not seen), both mounted within a housing 226, and a mechanical positioning arrangement 270 for supporting the housing 226 and moving it as required.

The optical system 220 can be a telecentric optical system providing the same magnification X at all distances therefrom. Optionally, there can be mounted an iris or other device for adjusting the depth of focus and the resolution of the system, either manually or automated.

The second imaging device 200 is configured to provide images formed by the optical system 220 and recorded by the electronic imaging device 240, with depth of focus and a resolution optimized to distinguish edges of a gemstone along a distance L which is not shorter than the length of the smallest planned edge of the smallest stone to be measured by the system and, optionally, not greater than a fraction of the maximal dimension of such smallest stone. The optimization of depth of focus and resolution, with the resultant magnification, is aimed at attaining images of small areas of the gemstone, such as for example, the areas of junctions of the gemstone including only parts of the associated facets that are adjacent thereto, with a quality sufficient for distinguishing details of said areas such as intersections between the imaged facets' parts, along the required distance, and it will ultimately result in that at least one of the magnification and resolution being higher, and/or depth of focus being lower, than that provided by the first imaging system when obtaining the original 3-D model.

The second imaging system 200 can further comprise image enhancing devices in the form of filters or polarizers 201 placed in front of the optical system 220, and thereby contrast of the images can be enhanced, or normally invisible structural effects can be made visible, if needed, thereby further enhancing the abilities of the system to accurately distinguish particulars needed for describing the gemstone.

The electronic imaging device 240 is in the form of a CCD camera which receives on its sensing pixels a magnified image formed by the optical system 220 and produces electronic images to be communicated via direct line 222 to the computer system 300.

The positioning arrangement 270 is configured to support the housing 226 with the optical system 220 and the electronic imaging device 240, and to provide translation thereof along an axis $I_1$ parallel to and spaced from rotation axis RA along a direction parallel or coinciding with the second optical axis SOA, as well as translation along the second optical axis SOA, and optionally to provide for rotational displacement around an axis $I_2$ perpendicular to the rotation axis RA and the SOA, as well as a translation along axis $I_2$. To this end, the positional arrangement 270 is connected to suitable step motors (not shown) that are controlled via control card 310 and communication line 223 by the computer system 300.

The computer system 300 is configured to control the operation of the stage station and the illumination and imaging systems, to execute image processing analyses and 3D computations necessary for performing corresponding computational steps described hereinbelow, and to provide a graphic user interface for human/machine interaction for controlling the whole 3D modeling process, and capable of presenting 3D models to the user.

In operation, the stage 30 rotates the mounted gemstone 1 such as to bring its side at which a surface portion to be imaged is disposed in front of the second imaging system 200; the mechanical positioning arrangement 270 moves the second imaging system 200, as required to bring the surface portion to be imaged into the field of view FOV of the second imaging system and at such distance from the second imaging system as to ensure that the optical system 220 is focused on the surface portion to be imaged.

The system 10 can further comprise a cover (not shown) to cover the cavity 15 thereof from outside influence at least during operation of the system.

The above system 10 can be built as a completely new system or can be produced as an upgrade of an existing system configured for producing a conventional 3D model of a gemstone, which includes a conventional stage and a conventional 3D modeling system.

With reference to FIGS. 7A to 7D, the following are the steps that can be performed in accordance with one example of such upgrading of an existing 3D modeling system 620, which can be Sarin's DiaMension™, with an existing stage 610, existing stage base 611, existing machine base 612, motor 615, computer system 300 configured in an existing manner, and existing control card 628:

the existing stage 610 with its existing stage base 611 is disassembled in its entirety from the existing machine base 612;

the motor 615 mounted in the existing system at position M1, at height MH1 from the Y-axis, is re-mounted at a lower position, at height MH2;

a new stage, which is built according to all the features and functionalities as described hereinabove for stage 30, is mounted in the same location instead of the existing stage 610, with the main difference that the stage base 42 is laid lower than the existing stage base 611 of the stage 610 by a height Δ;

referring now to FIG. 7B, an illumination system 710, with all features and details according to the illumination system 110, and an imaging device 720 with all features and details according to the imaging device 200, are installed in the corresponding locations as described above, to form the second 3D modeling system;

a new driver card 750 for the system is supplied and connected; and the computer system 300 is provided with a capability for controlling the system and providing necessary computations as described below.

Finally, a new cover is mounted to reversibly cover the mounting cavity with all its illumination devices 15 from outside influence at least during operation of the system.

Operation of the System 10

Whether built as a completely new system or as an upgrade of an existing system, the operation of the system 10 for producing an accurate 3D model of the gemstone G can comprise all or a part of the steps described below, with reference to block-diagrams 5A to 5C, depending on desired scope of examination of a gemstone.

Stage I: Gemstone Mounting and System Preparation

In step 1000, a size group (for example group B) for a gemstone 1 (for example gemstone 1b) to be examined is chosen among the groups of gemstones with which the system 10 is planned to operate (see FIG. 3 and corresponding explanations above).

Step 1001, it is ensured that the gemstone holder 31 of a corresponding size (in this case the gemstone holder 31b) is mounted on the stage base 42 and a lens is mounted in the imaging device 70 selected according the size group of the stone. During mounting of the gemstone holder 31, if required, the crown illumination device 160 is in its inoperative position, after which it is brought back to its operative position.

In step 1002, the stone is thoroughly cleaned and mounted on the gemstone holder 31, which in turn is mounted on the stage base 42, as described in detail hereinabove.

In step 1003, if a centering mechanism is used, it is utilized now, and then removed from the stage so as not to interfere with the operation.

Figure 5A:
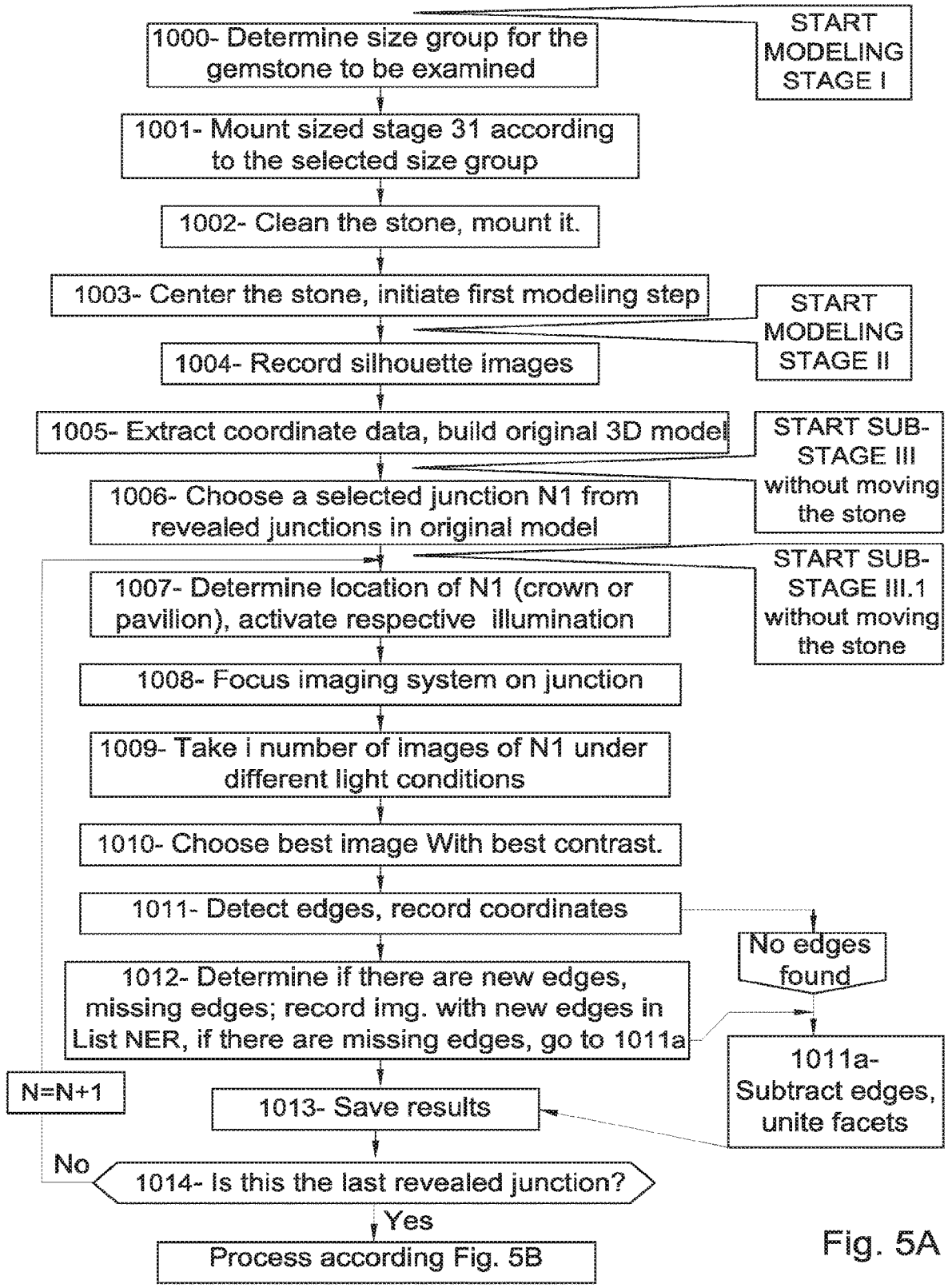
FIGS. 5A to 5C show a flow chart of a process according to one example of the currently disclosed subject matter.

If the system allows adjustment of the position of any of the pavilion, crown and girdle illumination devices by a user, this should be done in a next step (not included in FIG. 5A).

Upon activation of the system 10 by means of the respective command in the GUI 350, the system operates automatically as described below under control of the computer system 300.

Stage II: Scanning the Gemstone by the First 3D Modeling System 60 to Provide an Original 3D Model Thereof In step 1004, the first 3D-modeling system 60 is activated, the stage base 42 with the gemstone holder 31 and the gemstone is caused to rotate by predetermined amounts, the backlight illumination unit 62 illuminates the gemstone, and for each incremental rotation, an image of the silhouette of the gemstone against the bright backlight is formed and recorded by the first imaging device 70, until the gemstone has been rotated 360 degrees (alternatively the rotation of 180 degrees can be used where this is sufficient to obtain all necessary silhouettes of the stone).

In step 1005, upon completion of the process of obtaining silhouette images, the computer system 300 extracts 3D-relative coordinates of the imaged gemstone from the images by edge recognition techniques, and calculates the original 3D model 400 based on the extracted data, which includes inter alia a plurality N of revealed junctions and edges.

Stage III: Obtaining a more Accurate 3D Model of the Gemstone by the Second 3D Modeling System 100

Sub-stage III. 1: Distinguishing Edges and Junctions

Without moving the stone relative to the supporting surface 37, in the next step 1006, the second 3D modeling system 100 chooses a selected junction N1 amongst the revealed junctions found by the computer system 300.

In step 1007, the computer system 300 provides instructions to activate at least one of the three illumination devices, according to the location of the selected junction N1: if the selected junction N1 is located on the pavilion, the pavilion illumination system 120 is activated, if the junction N1 is located on the crown, the crown illumination system 160 is activated. At any time during operation, at least one, suitable illumination device is active. Sometimes it can be advantageous to operate two illumination devices; for example both pavilion and crown illumination devices can be used when junctions at the merger of the crown and table of the stone need to be imaged.

The system in step 1008 rotates the gemstone holder 31 and moves the imaging system 200 by means of the above described features to bring the selected junction N1 within the field of view FOV of the imaging system and to focus the imaging system on the junction N1.

In step 1009 an i number of images of the junction N1 is taken, under different lighting conditions LN1, with i>1. The lighting conditions LN1 are produced by a slight rotation of the gemstone 1b relative to the second 3D modeling system per increment, such that the selected junction N1 remains in the FOV of the imaging system, but under changed angles of its facets relative to the respectively operative illumination system and imaging system, thereby changing the light pattern reflected by the facets of gemstone 1b towards the imaging system 200, and producing different contrasts between the facets.

In step 1010, the computer system 300 compares the i images of the junction N1, and selects the best image with contrasts best suited for further processing (in the steps 1011—1025 below)

Figure 6A:
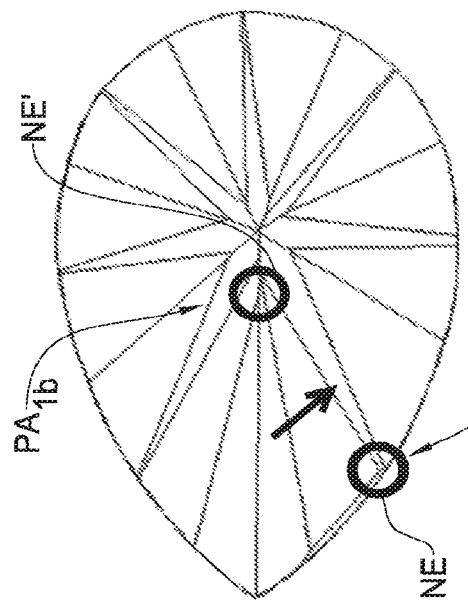
FIGS. 6A and 6B and FIGS. 6C and 6D are schematic representations of two examples of portions of original and accurate 3D models of a gemstone, respectively, produced in the framework of a method according to one example of the presently disclosed subject matter.
Figure 6B:
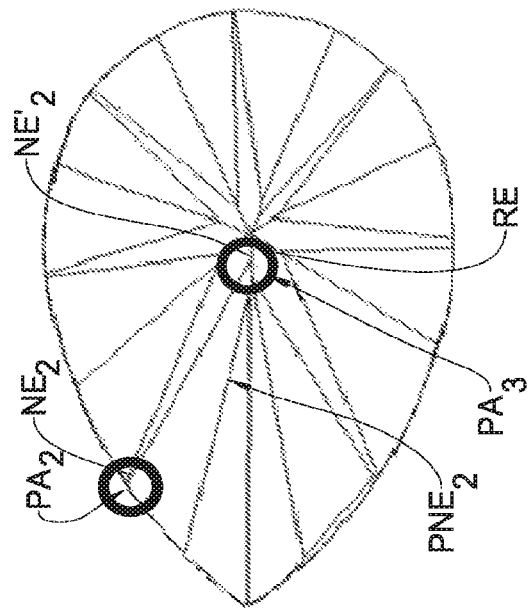
Figure 6C:
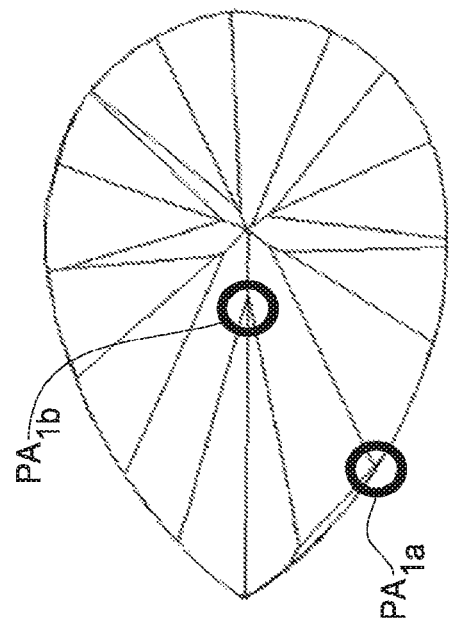
Figure 6D:
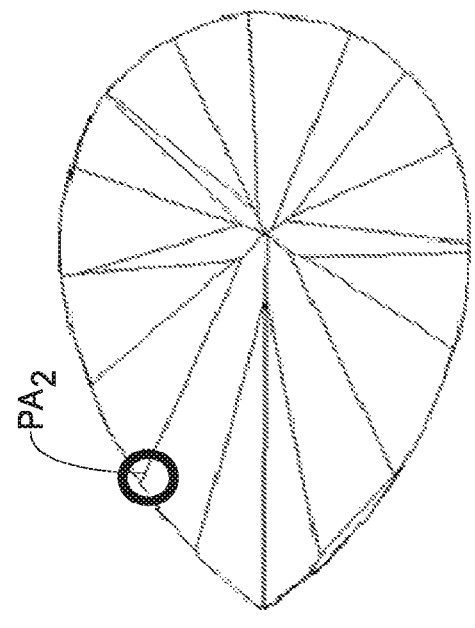
Figure 6E:
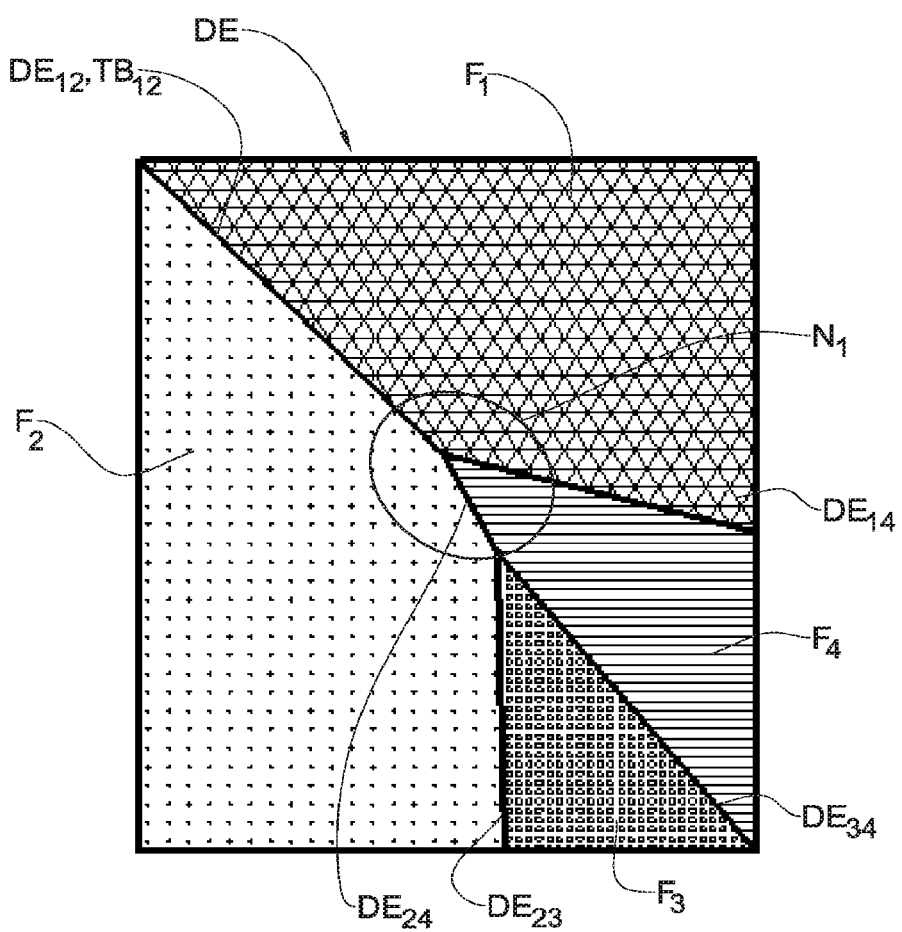
FIG. 6E schematically illustrates an exemplary image of one surface portion of the gemstone obtained within the framework of a method according to one example of the presently disclosed subject matter.

Referring now in particular to FIG. 6E, in step 1011, the computer system 300 determines particulars such as all detectable edges DE based on the selected image and establishes their coordinates:

For facets F1 and F2, the computer system 300 distinguishes a difference D12 in pixel color or brightness value at their mutual border MB12. The location where this difference D12 is largest is then defined as detected edge DE12.

Likewise, based on all facets F1 to F4, all other detected edges DE23, DE34, DE14 and DE24 are defined, and their coordinates are recorded, for further processing;

If in step 1011 no edges are visible, then step 1011a is performed.

If in step 1011 edges are visible, then step 1012 is performed.

In step 1012, the computer system 300 determines discrepancies between the number of edges NE detected in the selected image and the number of edges NER revealed in the junction N1 of the original 3D model. If NE>NER, there are new edges present in the selected image, and this is thus recorded in a list of images with new edges for later processing.

If NE<NER, there are edges missing in the image, and subsequently, step 1011a is performed.

In step 1011a, the computer system 300 associates all edges in the selected image with edges present in the original 3D model. Thus, if the number of revealed edges in the original 3D model at the region corresponding to that shown in the selected image, is greater than the number of edges found in the image, the superfluous edges present in the original 3D model, but missing from the image, are subtracted, and eventual adjacent facets are merged.

In step 1013, the computer system stores results of the previous steps in its memory or in another suitable non-transitory computer readable medium.

In step 1014, the computer system 300 checks for the revealed junctions that have not yet been processed. If there are such junctions left, the computer system moves to the next junction in its list, and jumps back to step 1007.

This loop is executed, until there are no revealed junctions left.

Figure 5B:
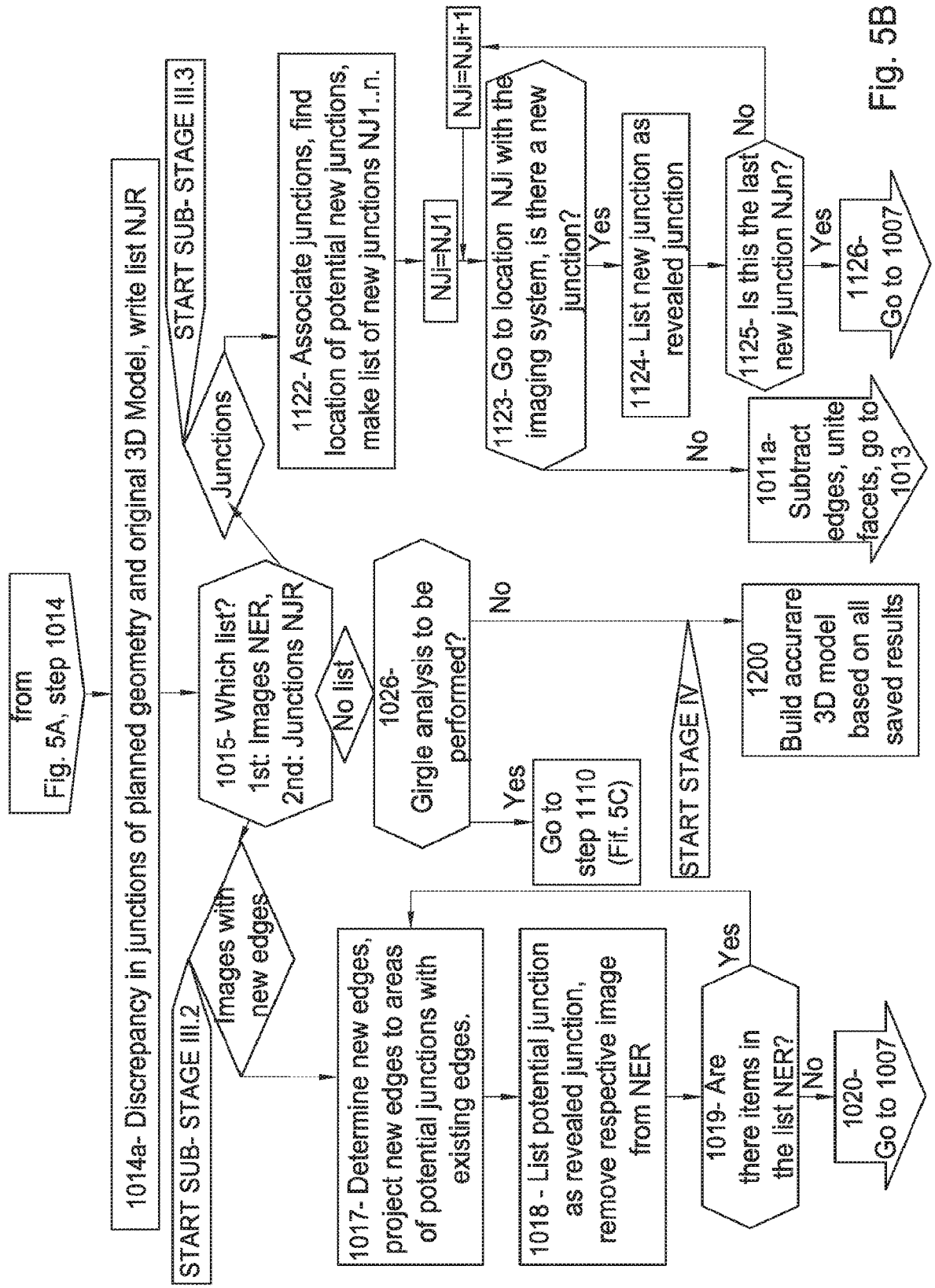

Once all the revealed junctions have been examined, and referring now to FIG. 5B, in step 1014*a*, the computer system compares the number of junctions NJ in the planned geometry to the number of revealed junctions NJR in the original 3D model, and if NJ>NJR, again, there are non-revealed junctions. The computer system records coordinates of these non-revealed junctions in a list for non-revealed junctions NoJR.

In step 1015 the computer system chooses between the two lists NER and NoJR as follows:

the system checks first, if the list NER contains items, and if in the affirmative, it chooses this list and enters sub-stage III. 2. If the list NER is empty, the system then moves to the list NoJR, and enters sub-stage III. 3. If the list NoJR is empty, the system moves to step 1110 and starts sub-stage III. 4, the girdle analysis, if a girdle is to be found.

If no girdle is to be found, the computer system moves to step 1200, and builds Sub-Stage III. 2: Determining New Junctions Based on New Edges In step 1017, the computer system has determined new edges by associating each edge in the image with a revealed edge in the original 3D model. Since, for all images in this list NER, by definition there are more edges than revealed edges, at the end of this process there are new edges disclosed. The computer system records all new edges of every selected image with their coordinates.

Since the coordinates of all new edges of every selected image have been recorded, the coordinates of their projections away from the junction found in the image can now be calculated and a potential junction area is determined where this extension is expected to meet with a respective revealed edge of the original 3D model. The coordinates for his potential junction area are recorded by the computer system.

The manner in which new edges and new junctions are associated to the original 3D model is described at the end of this description, in more detail with reference to FIGS. 6A to 6D.

For each potential junction area, step 1018 is performed by the computer system 300, by listing the potential junction as a revealed junction, and the respective image is removed from the list NER; as long as there are still items in the list NER, the computer system then jumps back to step 1017.

If there are no new items in the list NER, i.e. NER is empty, the computer system performs step 1020 by jumping back to step 1007 and performing the sub-stage III. 1 of steps 1007 to 1014, with each potential junction area now recorded as revealed junction.

Upon reaching step 1015, with an empty list of NER, the computer system will now either find items in the list NJR and process with the sub-stage III. 3 described below, or it will find both lists empty.

Sub-Stage III. 3: Determining New Junctions Based on the Planned Geometry

If there are items in NoJR, the computer system performs step 1122 by numbering the non-revealed junctions, and the computer system chooses a potential new junction NoJ1.

In step 1123, the computer system provides instructions for focusing the imaging system on the location for the potential new junction NoJ1.

In step 1124, if a new junction is found, the location is recorded as revealed junction. If no junction is to be found, the computer system performs step 1011*a* and follows the subsequent routine back to step 1015, where it will again find items in the list NoJR, and continue in the routine of steps 1122-1124.

If a new junction is found, the computer system performs step 1125 by deciding if this was the last potential new junction. If not, the computer system jumps to step 1123. If in the affirmative, the computer system performs step 1126 and returns to sub-stage III. 1, steps 1007-1014, and again repeats this loop until there are no revealed junctions left in the list.

Figure 5C:
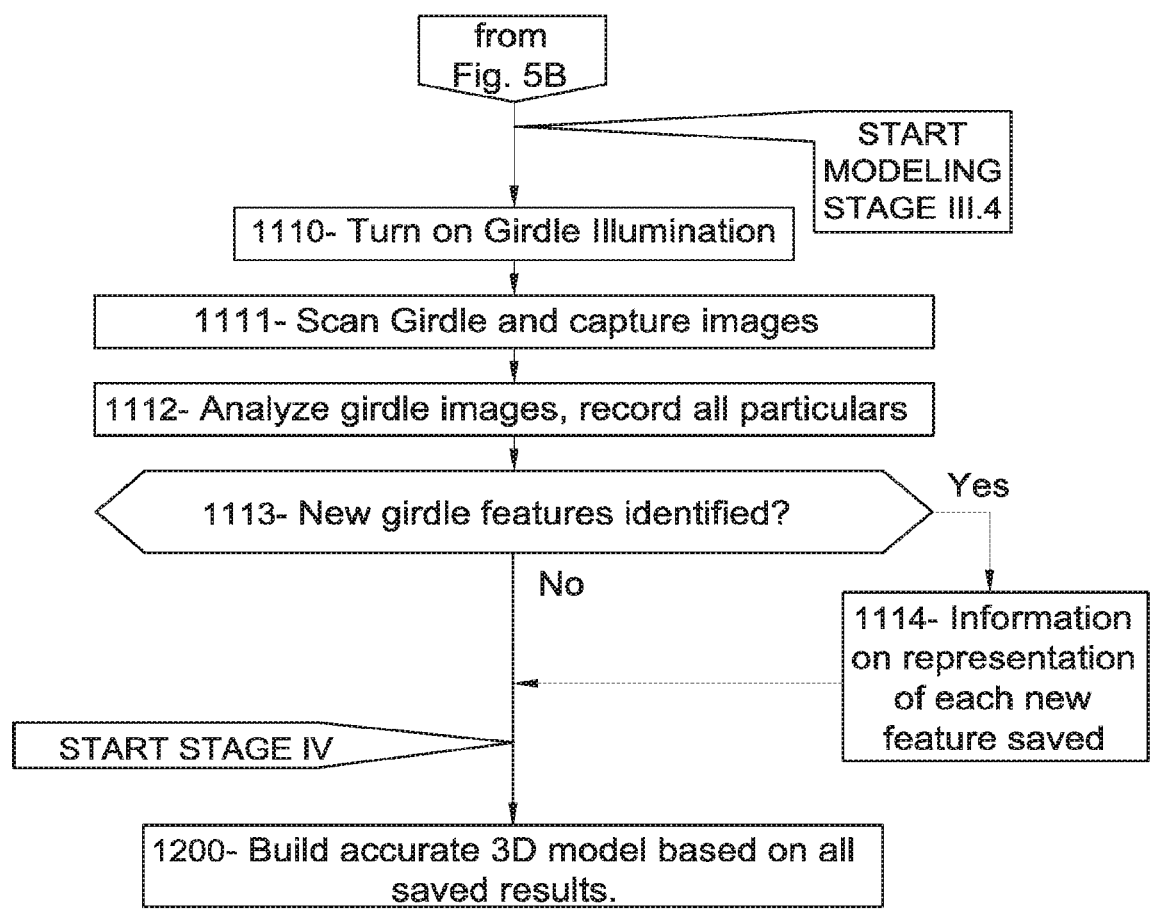

In step 1026, the computer system decides whether to progress to step 1110 (FIG. 5C)—to the girdle analysis process—or to forego girdle analysis and progress to step 1200. This decision can be made based on human intervention or automatically upon finding of a girdle.

Stage IV: Building an Accurate 3D Model

In step 1200, the computer system builds an accurate 3D model of the gemstone based on all saved results.

Optional Sub-Stage III. 4: Girdle Analysis

In step 1026, the computer system progresses to step 1110 (FIG. 5B)—to the girdle analysis process.

In step 1110, the computer system provides instructions for girdle illumination activation, and for shutting-off all other illuminations.

In step 1111, the girdle is scanned by capturing a plurality of images of different sections thereof. This scanning process is performed such that the whole girdle is imaged by the respective imaging system.

In step 1112, the images are analyzed by the computer system 300, and all distinguishable particulars are recorded. These particulars are used by the computer system in step 1113 to determine new girdle features absent from the planned girdle geometry, such as for example extra facets and/naturals.

The computer system thus first identifies the region where a new girdle feature is located, which can be at a location adjacent the place, where a junction is missing that was supposed exist, according to the planned pavilion/crown geometry, or where in the images taken in step 1111, there is a distortion in the girdle pattern relative to the one planned.

The computer system then defines borderlines of the above region, its shape and area and the new girdle feature is classified. For example, if the borderlines are straight lines, the new girdle feature is an extra facet, which is a planar surface. If the borderlines are not straight and clearly defined, this would be typical of a natural. Thus, in step 1114 the computing system makes a decision on the manner, in which each new girdle feature is to be represented in the accurate 3D model, and the corresponding information is stored.

Stage IV': Building an Accurate 3D Model with Girdle Information

In case the sub-stage III. 4 is performed, in step 1200 described above, the accurate 3D model of the gemstone can be complemented with girdle information obtained therein, based on images of different sections/particulars of the girdle and/or there description. This information can be in the form of the graphical representation of new girdle features, such as extra facets and/or naturals, added at the corresponding position on the girdle in the accurate 3D model of the stone, e.g. by drawing and presenting by the computer system borderlines of the new feature, and even adding thereto its graphical representation of its appearance as it appears in a corresponding image. The computer system can also knit the images of different sections of the girdle together to form a developed view of the whole girdle.

Associating, by the computer system. new edges and new junctions to the original 3D model, referred to in sub-stage III. 2 described above, will now be described with reference to FIG. 6A-6D, illustrating the way in which the computer system, based on the data described hereinabove, associates new edges and new junctions to the 3D model.

In a first case, where only a facet is missing but two revealed junctions PA1a, PA1b connected by the edge exist and are known, the computer system, upon examining junction PA1a, will detect that the new edge NE is supposed to connect to a second revealed junction PA1b and will verify at this second revealed junction PA1b if there is a missing edge NE' there, too, to verify the missing facet. If it didn't detect the missing edge at the second revealed junction PA1b, it will need another set of images along the detected edge to detect where this edge is connected to.

In a second case, where there is a missing junction, this means that a facet is missing and also the junction PA3 where the edge supposed to connect to is unknown. The computer system will calculate where the projection PNE2 of edge NE2, originating at the revealed junction PA2 is supposed to be connected to, and it will find that there is no known junction in that direction. The edge will then join with another revealed edge RE and that will be a suspicious position for the missing junction PA3. The computer system will need another set of images of this suspicious area at the suspicious position PA3 to verify if the partial edge NET, which is the end point of the projection from NE2, is really forming a junction there.

It should be noted that though in the above exemplary description of operation of the system, the analysis of the gemstone is performed for all its non-planar parts, namely, pavilion, crown and girdle, this does not necessarily need to be the case. Depending on the purpose of the analysis, only one part of a gemstone can be accurately modeled, e.g. when only one part of a rough stone has been cut to have a planned cut geometry.

Moreover, a system according to presently disclosed subject matter can be used for obtaining images of a gemstone for any desired purpose, with or without focusing on any particular locations and analyzing images thereof to find features not revealed by the method described above.

The invention claimed is:

1. A method of producing a 3D model of a gemstone, the method comprising:
A. providing a first 3D modelling system, the first 3D modelling system comprising: a stage for mounting a gemstone;
the first 3D modelling system further having at least e backlight illumination device and at least one imaging device, the stage being positioned between the at least one illumination device and the at least one first imaging device along a first optical axis (FOA);
mounting a gemstone on the stage;
providing a computer system having a control unit, the computer system controlling the operation of the at least one illumination device and the at least one imaging device;
rotating the stage around a gemstone rotation axis by predetermined amounts; under control of the computer system:

(1) scanning the outer surface of the gemstone and obtaining a plurality of electronic images of the silhouettes of the gemstone in different angular positions;
(2) after scanning the gemstone through 360 degrees of rotation of the stage, the computer system extracting 3D—relative coordinates of the imaged gemstone from the captured images by edge recognition, including facets, edges abounding the facets, and the locations of junctions each constituting an area of meeting of at least three edges associated with the at least the facets;
(3) calculating an original 3D model based on the captured images; and,
(4) storing the original 3D model; and,
B. providing a second 3D modelling system, the second 3D modelling system comprising:
the second 3d modelling system having a plurality of illumination devices and at least one second imaging device;
the second 3D modelling system having a second optical axis (SOA) different from the FOA;
the plurality of illumination devices including at least: a pavilion illumination device, a crown illumination device and a girdle illumination device;
wherein each of the plurality of illumination devices includes elements to provide diffused illumination to illuminate the mounted gemstone;
the computer system:
(1) causing the scanning per gemstone with one or more of the diffused illumination devices to obtain a plurality of images;
(2) imaging, based on the diffused illumination of the one or more illumination devices, at least one junction with only adjacent portions of its associated facets and edges, the location of the selected junction being determined based on the stored data from the original 3D model, the illumination conditions providing contrast between adjacent facets as to allow to distinguish an edge therebetween; and,
C. the computer system analyzing images taken by the second 3D modelling system to obtain data regarding the gemstone, and further processing the data to obtain an improved 3D model of the gemstone.

2. The method of claim 1, wherein the step (1) of the scanning of the gemstone with one or more of the diffused illumination devices to obtain a plurality of images farther comprises;
(a) if the selected junction is located on the pavilion of the gemstone, activating the pavilion illumination system;
(b) if the selected junction is located on the crown, activating the crown illumination system; and,
(c) if the selected area to be imaged is located on the girdle, activating the girdle illumination system.

3. The method of claim 2, further comprising activating at least two of the three diffused illumination systems to image one or more junctions at the merger of the crown and table of the gemstone.

4. The method of claim 1, wherein the pavilion illumination device comprises a plurality of LEDs and diffuser elements causing illumination light to exit from the device as a diffused light beam.

5. The method of claim 1, wherein the pavilion illumination device further comprises a contrast enhancing mask adjacent a light exit surface on the pavilion illumination device, whereby to provide a non-uniform illumination pattern to increase contrast between adjacent facets.

6. The method of claim 1, wherein the crown illumination device comprises a light guide with a proximal end, the proximal end being configured to receive one or more LEDs, and wherein a distal end of the light guide includes a diffusive coating configured to uniformly diffuse LED light exiting from the distal end of the lightguide.

7. The method of claim 1, wherein the at least one second imaging device includes a polarizer for enhancing the images obtained by the second imaging device.

8. The method of claim 1, wherein the pavilion illumination device is mounted and illuminates above and off-axis from the gemstone rotation axis above the mounted gemstone.

9. The method of claim 1, wherein the crown illumination device is mounted below the gemstone and illuminates the gemstone from below the gemstone.

10. The method of claim 1, wherein the girdle illumination device is mounted and illuminates the gemstone in line with the girdle of the gemstone orthogonal to the gemstone rotation axis.

11. An apparatus for producing a 3D model of a gemstone, the apparatus comprising:
A. a first 3D modelling system, the first 3D modelling system comprising:
a stage for mounting a gemstone;
the first 3D modelling system further having at least one backlight illumination device and at least one imaging device, the stage being positioned between the at least one illumination device and the at least one first imaging device along a first optical axis (FOA);
a mount for mounting a gemstone on the stage;
a computer system having a control unit, the computer system being configured to control the operation of the at least one illumination device and the at least one imaging device by:
(1) causing the rotation of the stage about a gemstone rotation axis by predetermined amounts;
(2) causing scanning the outer surface of the gemstone and obtaining a plurality of electronic images of the silhouettes of the gemstone in different angular positions;
(3) after scanning the gemstone through 360 degrees of rotation of the stage, the computer system causing the extraction of 3D-relative coordinates of the imaged gemstone from the captured images by edge recognition, including facets, edges abounding the facets, and the locations of junctions each constituting an area of meeting of at least three edges associated with the at least the facets;
(4) causing the calculation of an original 3D model based on the captured images; and,
(5) causing the storing of the original 3D model; and,
B. a second 3D modelling system, the second 3D modelling system comprising: the second 3d modelling system having a plurality of illumination devices and at least one second imaging device;
the second 3D modelling system having a second optical axis (SOA) different from the FOA;
the plurality of illumination devices including at least: a pavilion illumination device, a crown illumination device and a girdle illumination device;
wherein each of the plurality of illumination devices includes elements to provide diffused illumination to illuminate the mounted gemstone;
the computer system being configured to:
(1) cause the scanning of the gemstone with one or more of the diffused illumination devices to obtain a plurality of images;

(2) cause imaging, based on the diffused illumination of the one or more illumination devices, of at least one junction with only adjacent portions of its associated facets and edges, the location of the selected junction being determined based on the stored data from the original 3D model, wherein the illumination conditions provide contrast between adjacent facets as to allow to distinguish an edge therebetween; and, the computer system being further configured to analyze images taken by the second 3D modeling system to obtain data regarding the gemstone, and further being configured to process the data to obtain an improved 3D model of the gemstone.

12. The apparatus of claim 11, further comprising, wherein
the computer is configured to, upon the scanning of the gemstone with one or more of the diffused illumination devices to obtain a plurality of images:
(a) if the selected junction is located on the pavilion of the gemstone, activating the pavilion illumination system;
(b) if the selected junction is located on the crown, activating the crown illumination system; and,
(c) if the selected area to be imaged is located on the girdle, activating the girdle illumination system.

13. The apparatus of claim 11, further comprising the computer system being configured to activate at least two of the three diffused illumination systems to image one or more junctions at the merger of the crown and table of the gemstone.

14. The apparatus of claim 11, wherein the pavilion illumination device comprises a plurality of LEDs and diffuser elements causing illumination light to exit from the device as a diffused light beam.

15. The apparatus of claim 11, wherein the pavilion illumination device further comprises a contrast enhancing mask adjacent a light exit surface on the pavilion illumination device, whereby to provide a non-uniform illumination pattern to increase contrast between adjacent facets.

16. The apparatus of claim 11, wherein the crown illumination device comprises a light guide with a proximal end, the proximal end being configured to receive one or more LEDs, and wherein a distal end of the light guide includes a diffusive coating configured to uniformly diffuse LED light exiting from the distal end of the lightguide.

17. The apparatus of claim 11, wherein the at least one second imaging device includes a polarizer for enhancing the images obtained by the second imaging device.

18. The apparatus of claim 11, wherein the pavilion illumination device is mounted and illuminates above and off-axis from the gemstone rotation axis above the mounted gemstone.

19. The apparatus of claim 11, wherein the crown illumination device is mounted below the gemstone and illuminates the gemstone from below the gemstone.

20. The apparatus of claim 11, wherein the girdle illumination device is mounted and illuminates the gemstone in line with the girdle of the gemstone orthogonal to the gemstone rotation axis.

21. A method of producing a 3D model of a gemstone, the method comprising:
A. providing a first 3D modelling system, the first 3D modelling system comprising:
a stage for mounting a gemstone;
at least one first illumination device and at least one first imaging device positioned along a first optical axis (FOA);

mounting a gemstone on the stage;
providing a computer system having a control unit, the computer system controlling the operation of the first 3D modelling system;
rotating the stage around a gemstone rotation axis by predetermined amounts;
under control of the computer system:
(1) illuminating the gemstone by the at least one illumination device and obtaining by the at least one imaging device a plurality of electronic images in different angular positions of the gemstone;
(2) after the completion of obtaining images, the computer system extracting 3D-relative coordinates of the gemstone from the captured images, including facets, edges abounding the facets, and the locations of junctions each constituting an area of meeting of at least three edges associated with the at least the facets;
(3) calculating an original 3D model based on the captured images; and
(4) storing the original 3D model; and
B. providing a second 3D modelling system, the second 3D modelling system comprising:
one or more second illumination devices different from the first illumination device and at least one second imaging device different from the first imaging device, both positioned along a second optical axis (SOA) different from the FOA;
the one or more second illumination devices being configured to function as at least two of the following: a pavilion illumination device, a crown illumination device and a girdle illumination device;
controlling the second 3D modelling system by the computer system to perform:
(1) illuminating the gemstone with one or more of the second illumination devices;
(2) imaging selected areas of the gemstone, when performing the illumination with one or more of the second illumination devices to obtain, by the at least one second imaging device, images of said areas including at least one selected junction with only adjacent portions of its associated facets and edges, the location of the selected junction being determined based on data stored from the original 3D model, under illumination conditions providing contrast between adjacent facets as to allow to distinguish an edge therebetween; and
C. the computer system analyzing the images taken by the second 3D modelling system to obtain additional data regarding the gemstone, and further processing the data from the original 3D model and the additional data to obtain an improved 3D model of the gemstone.

22. The method of claim 21, wherein the step (1) of illuminating with one or more of the second illumination devices further comprises at least two of the following:
(a) if the selected junction is located on the pavilion of the gemstone, activating one or more of the illumination devices to function at least as the pavilion illumination device;
(b) if the selected junction is located on the crown, activating one or more of the illumination devices to function at least as the crown illumination device; and
(c) if the selected area to be imaged is located on the girdle, activating one or more of the illumination devices to function at least as the girdle illumination device.

23. The method of claim 21, further comprising activating least two of the second illumination devices to image one or more junctions at the merger of the crown and table of the gemstone.

24. The method of claim 21, wherein the second illumination device functioning as a pavilion illumination device is mounted and illuminates above and off axis from the gemstone rotation axis above the mounted gemstone.

25. The method of claim 21, wherein second illumination device functioning as a crown illumination device is mounted below the gemstone and illuminates the gemstone from below the gemstone.

26. The method of claim 21, wherein the second illumination device functioning as a girdle illumination device is mounted and illuminates the gemstone in line with the girdle of the gemstone orthogonal to the gemstone rotation axis.

27. The method of 21, wherein the second illumination device configured to function as a pavilion illumination device is mounted and illuminates above and off-axis from the gemstone rotation axis above the mounted gemstone.

28. The method of 21, wherein the second illumination device configured to function as a crown illumination device is mounted below the gemstone and illuminates the gemstone from below the gemstone.

29. The method of 21, wherein the second illumination device configured to function as the girdle illumination device is mounted and illuminates the gemstone in line with the girdle of the gemstone orthogonal to the gemstone rotation axis.

30. An apparatus for producing a 3D model of a gemstone, the apparatus comprising:
A. a first 3D modelling system, the first 3D modelling system comprising: a rotatable stage for mounting a gemstone;
at least one first illumination device and at least one first imaging device positioned along a first optical axis (FOA);
a mount for mounting a gemstone on the stage;
a computer system having a control unit, the computer system being configured to control the operation of the first 3D modeling system by:
(1) causing the rotation of the stage about a gemstone rotation axis by predetermined amounts;
(2) causing illumination of the gemstone and obtaining a plurality of electronic images in different angular positions of the gemstone;
(3) after the completion of obtaining the images, causing the extraction of 3D-relative coordinates of the gemstone from the captured images, including facets, edges abounding the facets, and the locations of junctions each constituting an area of meeting of at least three edges associated with the at least the facets;
(4) causing the calculation of an original 3D model based on the captured images;
causing the storing of the original 3D model; and
B. a second 3D modelling system, the second 3D modelling system having a second optical axis (SOA) different from the FOA and comprising:
one or more second illumination devices different from the first illumination and at least one second imaging device different from the first imaging device;
the one or more second illumination devices being configured to function as at least two of the following devices: a pavilion illumination device, a crown illumination device and a girdle illumination device;
the computer system being configured to control the operation of the second 3D modelling system to:

(1) cause illuminating the gemstone with one or more of the second illumination devices;

(2) cause imaging of selected areas of the gemstone, when performing the illumination with the one or more illumination devices, including at least one selected junction with only adjacent portions of its associated facets and edges, the location of the selected junction being determined based on data stored from the original 3D model, wherein illumination conditions during which the imaging is performed provide contrast between adjacent facets as to allow to distinguish an edge therebetween; and C. the computer system being further configured to analyze images taken by the second 3D modelling system to obtain additional data regarding the gemstone and further being configured to process the data from the original 3D model and the additional data to obtain an improved 3D model of the gemstone.

31. The apparatus of claim 30, further comprising, wherein the computer is configured to cause, upon causing the illumination of the gemstone with one or more of the illumination devices:

(a) if the selected junction is located on the pavilion of the gemstone, activating the second illumination device configured to function as a pavilion illumination device;

(b) if the selected junction is located on the crown, activating the second illumination device configured to function as a crown illumination device; and, (c) if the selected area to be imaged is located on the girdle, activating the second illumination device configured to function as a girdle illumination device.

32. The apparatus of claim 30, further comprising the computer system being configured to activate at least two of the illumination devices to image one or more junctions at the merger of the crown and table of the gemstone.

33. The apparatus of claim 30, wherein the second illumination device configured to function as a pavilion illumination device comprises a plurality of LEDs and diffuser elements causing illumination light to exit from the device as a diffused light beam.

34. The apparatus of claim 30, wherein the second illumination device configured to function as a pavilion illumination device comprises a contrast enhancing mask adjacent a light exit surface on the pavilion illumination device, whereby to provide a non-uniform in illumination pattern to increase contrast between adjacent facets.

35. The apparatus of claim 30, wherein the second illumination device configured to function as a crown illumination device comprises a light guide with a proximal end, the proximal end being configured to receive one or more LEDs, and wherein a distal end of the light guide includes a diffusive coating configured to uniformly diffuse LED light exiting from the distal end of the lightguide.

36. The apparatus of claim 30, wherein the at least one second imaging device includes a polarizer for enhancing the images obtained by the second imaging device.

* * * * *